US008635643B2

(12) United States Patent
Gray et al.

(10) Patent No.: US 8,635,643 B2
(45) Date of Patent: Jan. 21, 2014

(54) SYSTEM AND METHOD FOR PROVIDING INTERACTIVE MEDIA CONTENT OVER A NETWORK

(75) Inventors: James Harold Gray, Ellijay, GA (US); Thomas Jefferson Brothers, Gainesville, GA (US); William Randolph Matz, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1909 days.

(21) Appl. No.: 10/611,259

(22) Filed: Jun. 30, 2003

(65) Prior Publication Data

US 2004/0268401 A1 Dec. 30, 2004

(51) Int. Cl.
*H04N 7/10* (2006.01)
*H04N 7/025* (2006.01)

(52) U.S. Cl.
USPC ........... 725/35; 725/34; 725/36; 725/40; 725/41; 725/42; 725/43; 725/52

(58) Field of Classification Search
USPC .................. 725/32, 34–36, 40–43, 52
See application file for complete search history.

(56) References Cited

U.S. PATENT DOCUMENTS

| | | |
|---|---|---|
| 3,798,610 A | 3/1974 | Bliss et al. |
| 3,886,302 A | 5/1975 | Kosco |
| 4,130,833 A | 12/1978 | Chomet |
| 4,258,386 A | 3/1981 | Cheung |
| 4,264,925 A | 4/1981 | Freeman et al. |
| 4,361,851 A | 11/1982 | Asip et al. |
| 4,476,488 A | 10/1984 | Merrell |
| 4,488,179 A | 12/1984 | Kruger |
| 4,536,791 A | 8/1985 | Campbell et al. |
| 4,566,030 A | 1/1986 | Nickerson et al. |
| 4,567,591 A | 1/1986 | Gray et al. |
| 4,573,072 A | 2/1986 | Freeman |
| 4,598,288 A | 7/1986 | Yarbrough et al. |
| 4,688,248 A | 8/1987 | Tomizawa |
| 4,689,661 A | 8/1987 | Barbieri et al. |
| 4,698,670 A | 10/1987 | Matty |
| 4,720,873 A | 1/1988 | Goodman et al. |
| 4,816,904 A | 3/1989 | McKenna et al. |
| 4,862,268 A | 8/1989 | Campbell et al. |
| 4,890,322 A | 12/1989 | Russell, Jr. |
| 4,890,332 A | 12/1989 | Takahashi |

(Continued)

FOREIGN PATENT DOCUMENTS

WO 9414284 6/1994

OTHER PUBLICATIONS

Zap2it.com: "TV Listings Frequently Asked Questions", http://web.archive.org/web/20000903002526/www.zap2it.com/index/1,1146,4_I_0_000,FF.html.

(Continued)

*Primary Examiner* — Jason Salce
(74) *Attorney, Agent, or Firm* — Toler Law Group, PC

(57) ABSTRACT

According to one aspect of the present invention, systems and methods are provided for informing a user of an interactive television service of available content from an Internet web site and redirecting the user to the Internet content responsive to selection of a hot key embedded in content signals. According to another aspect of the present invention, systems and methods are provided for caching alternate content on a user's terminal device and redirecting the user to the cached content responsive to selection of a hot key embedded in content signals.

38 Claims, 14 Drawing Sheets

(56) References Cited

U.S. PATENT DOCUMENTS

| | | | |
|---|---|---|---|
| 4,912,552 A | 3/1990 | Allison, III et al. | |
| 4,977,455 A | 12/1990 | Young | |
| 5,010,585 A | 4/1991 | Garcia | |
| 5,010,858 A | 4/1991 | Schierling et al. | |
| 5,038,211 A | 8/1991 | Hallenbeck | |
| 5,046,090 A | 9/1991 | Walker et al. | |
| 5,046,092 A | 9/1991 | Walker et al. | |
| 5,055,924 A | 10/1991 | Skutta | |
| 5,161,019 A | 11/1992 | Emanuel | |
| 5,173,900 A | 12/1992 | Miller et al. | |
| 5,181,438 A | 1/1993 | Wellman | |
| 5,191,645 A | 3/1993 | Carlucci et al. | |
| 5,208,665 A | 5/1993 | McCalley et al. | |
| 5,247,347 A | 9/1993 | Litteral | |
| 5,249,044 A | 9/1993 | Von Kohorn | |
| 5,260,778 A | 11/1993 | Kauffman | |
| 5,262,860 A | 11/1993 | Ftitzpatrick | |
| 5,287,181 A | 2/1994 | Holman | |
| 5,305,195 A | 4/1994 | Murphy | |
| 5,335,277 A | 8/1994 | Harvey | |
| 5,339,315 A | 8/1994 | Maeda | |
| 5,343,240 A | 8/1994 | Yu | |
| 5,357,276 A | 10/1994 | Banker | |
| 5,374,951 A | 12/1994 | Welsh | |
| 5,390,027 A | 2/1995 | Henmi | |
| 5,404,393 A | 4/1995 | Remillard | |
| 5,444,499 A | 8/1995 | Saitoh | |
| 5,446,490 A | 8/1995 | Blahut | |
| 5,446,919 A | 8/1995 | Wilkins | |
| 5,448,568 A | 9/1995 | Delpuch et al. | |
| 5,481,542 A | 1/1996 | Logston | |
| 5,483,277 A | 1/1996 | Granger | |
| 5,502,499 A | 3/1996 | Birch | |
| 5,539,451 A | 7/1996 | Carey | |
| 5,539,822 A | 7/1996 | Lett | |
| 5,541,662 A | 7/1996 | Adams et al. | |
| 5,541,917 A | 7/1996 | Farris | |
| 5,555,838 A | 9/1996 | Bergman | |
| 5,557,320 A | 9/1996 | Krebs | |
| 5,557,338 A | 9/1996 | Maze | |
| 5,564,073 A | 10/1996 | Takahisa | |
| 5,585,838 A | 12/1996 | Lawler | |
| 5,585,858 A | 12/1996 | Harper | |
| 5,592,477 A | 1/1997 | Farris | |
| 5,592,551 A | 1/1997 | Lett et al. | |
| 5,600,775 A | 2/1997 | King | |
| 5,608,448 A | 3/1997 | Smoral | |
| 5,629,733 A | 5/1997 | Youman | |
| 5,640,192 A | 6/1997 | Garfinkle | |
| 5,648,824 A | 7/1997 | Dunn | |
| 5,661,517 A | 8/1997 | Budow | |
| 5,721,829 A | 2/1998 | Dunn | |
| 5,732,219 A | 3/1998 | Blumer et al. | |
| 5,774,664 A * | 6/1998 | Hidary et al. | 725/110 |
| 5,779,549 A | 7/1998 | Walker | |
| 5,781,246 A | 7/1998 | Alten | |
| 5,784,683 A | 7/1998 | Sistanizadeh et al. | |
| 5,796,426 A | 8/1998 | Gullichsen | |
| 5,797,001 A | 8/1998 | Augenbraun et al. | |
| 5,805,154 A | 9/1998 | Brown | |
| 5,818,438 A | 10/1998 | Howe | |
| 5,820,459 A | 10/1998 | Acres et al. | |
| 5,822,123 A | 10/1998 | Davis | |
| 5,828,420 A | 10/1998 | Marshall | |
| 5,847,771 A | 12/1998 | Cloutier | |
| 5,864,823 A | 1/1999 | Levitan | |
| 5,867,205 A | 2/1999 | Harrison | |
| 5,867,688 A | 2/1999 | Simmon et al. | |
| 5,880,768 A | 3/1999 | Lemmons | |
| 5,880,769 A | 3/1999 | Nemirofsky | |
| 5,892,508 A | 4/1999 | Howe | |
| 5,929,931 A | 7/1999 | Hoekstra | |
| 5,931,908 A | 8/1999 | Gerba | |
| 5,977,964 A | 11/1999 | Williams | |
| 5,990,927 A | 11/1999 | Hendricks | |
| 6,005,561 A | 12/1999 | Hawkins | |
| 6,008,802 A | 12/1999 | Iki | |
| 6,012,983 A | 1/2000 | Walker | |
| 6,018,764 A | 1/2000 | Field | |
| 6,025,837 A * | 2/2000 | Matthews et al. | 715/721 |
| 6,100,883 A | 8/2000 | Hoarty | |
| 6,108,042 A | 8/2000 | Adams | |
| 6,113,495 A | 9/2000 | Walker | |
| 6,144,402 A | 11/2000 | Norsworthy et al. | |
| 6,157,413 A | 12/2000 | Hanafee | |
| 6,201,536 B1 | 3/2001 | Hendricks | |
| 6,213,880 B1 | 4/2001 | Sim | |
| 6,230,172 B1 | 5/2001 | Purnaveja | |
| 6,240,555 B1 * | 5/2001 | Shoff et al. | 725/110 |
| 6,244,957 B1 | 6/2001 | Walker | |
| 6,256,785 B1 | 7/2001 | Klappert | |
| 6,279,112 B1 | 8/2001 | O'Toole, Jr. et al. | |
| 6,298,482 B1 | 10/2001 | Seidman et al. | |
| 6,317,885 B1 | 11/2001 | Fries | |
| 6,324,544 B1 | 11/2001 | Alam | |
| 6,324,694 B1 * | 11/2001 | Watts et al. | 725/32 |
| 6,327,574 B1 | 12/2001 | Kramer | |
| 6,349,410 B1 | 2/2002 | Lortz | |
| 6,357,042 B2 | 3/2002 | Srinivasan | |
| 6,363,525 B1 | 3/2002 | Dougherty et al. | |
| 6,418,556 B1 | 7/2002 | Bennington | |
| 6,419,137 B1 | 7/2002 | Marshall | |
| 6,463,207 B1 | 10/2002 | Abecassis | |
| 6,463,585 B1 | 10/2002 | Hendricks | |
| 6,463,858 B2 | 10/2002 | Weber et al. | |
| 6,468,155 B1 | 10/2002 | Zucker | |
| 6,477,579 B1 * | 11/2002 | Kunkel et al. | 709/229 |
| 6,483,986 B1 | 11/2002 | Krapf | |
| 6,490,725 B2 | 12/2002 | Kikinis | |
| 6,491,651 B1 | 12/2002 | Leahy et al. | |
| 6,502,242 B1 | 12/2002 | Howe | |
| 6,535,889 B1 | 3/2003 | Headrick | |
| 6,557,006 B1 | 4/2003 | Headrick | |
| 6,564,246 B1 | 5/2003 | Varma et al. | |
| 6,567,982 B1 | 5/2003 | Howe | |
| 6,571,392 B1 * | 5/2003 | Zigmond et al. | 725/110 |
| 6,615,408 B1 * | 9/2003 | Kaiser et al. | 725/112 |
| 6,634,942 B2 | 10/2003 | Walker | |
| 6,676,522 B2 | 1/2004 | Rowe | |
| 6,718,551 B1 | 4/2004 | Swix | |
| 6,738,978 B1 | 5/2004 | Hendricks | |
| 6,756,997 B1 | 6/2004 | Ward | |
| 6,760,916 B2 | 7/2004 | Holtz | |
| 6,800,029 B2 | 10/2004 | Rowe | |
| 6,826,775 B1 | 11/2004 | Howe | |
| 6,850,252 B1 | 2/2005 | Hoffberg | |
| 6,886,178 B1 * | 4/2005 | Mao et al. | 725/52 |
| 6,898,762 B2 | 5/2005 | Ellis | |
| 6,967,566 B2 | 11/2005 | Weston | |
| 7,100,183 B2 | 8/2006 | Kunkel et al. | |
| 7,237,253 B1 | 6/2007 | Blackketter | |
| 7,249,321 B2 | 7/2007 | Bushey | |
| 7,266,835 B2 | 9/2007 | Halbert | |
| 7,293,276 B2 | 11/2007 | Phillips | |
| 7,337,457 B2 * | 2/2008 | Pack et al. | 725/40 |
| 2001/0016943 A1 | 8/2001 | Maas et al. | |
| 2001/0054134 A1 | 12/2001 | Nagatomo et al. | |
| 2002/0056093 A1 | 5/2002 | Kunkel | |
| 2002/0056129 A1 | 5/2002 | Blackketter et al. | |
| 2002/0059586 A1 | 5/2002 | Carney et al. | |
| 2002/0059644 A1 | 5/2002 | Andrade et al. | |
| 2002/0069132 A1 | 6/2002 | Perkes | |
| 2002/0083464 A1 | 6/2002 | Tomsen | |
| 2002/0083469 A1 | 6/2002 | Jeannin | |
| 2002/0087402 A1 | 7/2002 | Zustak | |
| 2002/0124252 A1 | 9/2002 | Schaefer et al. | |
| 2002/0132585 A1 | 9/2002 | Palermo et al. | |
| 2002/0138561 A1 | 9/2002 | Chatfield et al. | |
| 2002/0147984 A1 | 10/2002 | Thomsen | |
| 2002/0147988 A1 | 10/2002 | Nakano | |
| 2002/0156870 A1 | 10/2002 | Borournand | |
| 2002/0157099 A1 | 10/2002 | Schrader et al. | |
| 2002/0162121 A1 | 10/2002 | Mitchell | |
| 2002/0164155 A1 | 11/2002 | Mate | |

(56) References Cited

U.S. PATENT DOCUMENTS

| | | |
|---|---|---|
| 2003/0005437 A1 | 1/2003 | Feuer et al. |
| 2003/0005448 A1 | 1/2003 | Axelsson et al. |
| 2003/0018969 A1 | 1/2003 | Humpleman |
| 2003/0037332 A1 | 2/2003 | Chapin et al. |
| 2003/0051238 A1 | 3/2003 | Barone, Jr. |
| 2003/0067544 A1 | 4/2003 | Wada |
| 2003/0067554 A1 | 4/2003 | Klarfeld et al. |
| 2003/0070167 A1 | 4/2003 | Holtz |
| 2003/0088872 A1 | 5/2003 | Maissel et al. |
| 2003/0088875 A1 | 5/2003 | Gay et al. |
| 2003/0093790 A1 | 5/2003 | Logan et al. |
| 2003/0110171 A1 | 6/2003 | Ozer |
| 2003/0110499 A1 | 6/2003 | Knudson |
| 2003/0111742 A1 | 6/2003 | Iwasaki et al. |
| 2003/0117445 A1 | 6/2003 | Hendricks et al. |
| 2003/0121051 A1 | 6/2003 | Howe et al. |
| 2003/0145323 A1 | 7/2003 | Hendricks |
| 2003/0149975 A1 | 8/2003 | Eldering |
| 2003/0163828 A1 | 8/2003 | Agnihotri |
| 2003/0182567 A1 | 9/2003 | Barton |
| 2003/0204847 A1 | 10/2003 | Ellis |
| 2003/0208754 A1 | 11/2003 | Sridhar |
| 2003/0233656 A1 | 12/2003 | Sie |
| 2003/0235407 A1 | 12/2003 | Lord |
| 2004/0003402 A1 | 1/2004 | McKenna |
| 2004/0006509 A1 | 1/2004 | Mannik |
| 2004/0045028 A1 | 3/2004 | Harris |
| 2004/0049785 A1 | 3/2004 | Grzeczkowski et al. |
| 2004/0098754 A1 | 5/2004 | Vella |
| 2004/0103032 A1 | 5/2004 | Maggio |
| 2004/0111742 A1 | 6/2004 | Hendricks |
| 2004/0122731 A1 | 6/2004 | Mannik |
| 2004/0163101 A1 | 8/2004 | Swix |
| 2004/0168188 A1 | 8/2004 | Bennington |
| 2004/0194138 A1 | 9/2004 | Boylan |
| 2004/0220858 A1 | 11/2004 | Maggio |
| 2004/0235567 A1 | 11/2004 | Chatani |
| 2004/0243470 A1 | 12/2004 | Ozer |
| 2004/0243623 A1 | 12/2004 | Ozer |
| 2004/0261127 A1 | 12/2004 | Freeman |
| 2005/0021403 A1 | 1/2005 | Ozer |
| 2005/0086688 A1 | 4/2005 | Omoigui |
| 2005/0091111 A1 | 4/2005 | Green |
| 2005/0097599 A1 | 5/2005 | Plotnick |
| 2005/0108776 A1 | 5/2005 | Carver |
| 2005/0114906 A1 | 5/2005 | Hoarty |
| 2005/0196139 A1 | 9/2005 | Blackketter |
| 2005/0204030 A1 | 9/2005 | Koch |
| 2005/0204385 A1 | 9/2005 | Sull |
| 2005/0216932 A1 | 9/2005 | Danker |
| 2005/0235318 A1 | 10/2005 | Grauch |
| 2005/0251820 A1 | 11/2005 | Stefanik |
| 2005/0262542 A1 | 11/2005 | DeWeese |
| 2005/0267809 A1 | 12/2005 | Zheng |
| 2005/0267810 A1 | 12/2005 | Zheng |
| 2005/0267820 A1 | 12/2005 | Zheng |
| 2006/0010476 A1 | 1/2006 | Kelly |
| 2006/0053049 A1 | 3/2006 | Nolan |
| 2006/0075430 A1 | 4/2006 | Park |
| 2006/0087987 A1 | 4/2006 | Witt |
| 2006/0190966 A1 | 8/2006 | McKissick et al. |
| 2006/0200842 A1 | 9/2006 | Chapman |
| 2007/0067805 A1 | 3/2007 | Macrae |
| 2007/0107035 A1 | 5/2007 | Howe |
| 2007/0124763 A1 | 5/2007 | Ellis |
| 2007/0136773 A1 | 6/2007 | O'Neil |
| 2007/0155506 A1 | 7/2007 | Malik |
| 2007/0157235 A1 | 7/2007 | Teunissen |
| 2007/0168884 A1 | 7/2007 | Weeks |
| 2007/0186269 A1 | 8/2007 | Malik |
| 2007/0208766 A1 | 9/2007 | Malik |

OTHER PUBLICATIONS

Cauley, Leslie "Microsoft, Baby Bell Form Video Alliance", The Wall Street Journal, Sep. 26, 1994.

Chorianopoulos, Konstantinos, "The Digital Set-Top Box as a Virtual Channel Provider", Dept. of Management Science and Technology, Athens University of Economics Apr. 2003.

Dransfeld, Henning et al, "Interactive TV and Formula One a Strategic Issue for Engine Suppliers", European Business Review, 1999.

Droitcourt, J.L., "Understanding How Interactive Television Set-Top Box Works . . . And What it will Mean to the Customer", International Broadcasting Convention, Sep. 14-18, 1995.

Elmer-Dewitt, Phillip, "Ready for Prime Time?", Time Archive, Dec. 26, 1994.

Elmer-Dewitt, Phillip, "Play . . . Fast Forward . . . Rewind . . . Pause U.S. Firms Want to Wire America for Two-Way TV, but their Systems Are Not Ready for Prime Time", Time Archive May 23, 1994.

Grant, Peter, "On-Demand TV Expands via Underused Fiber Highways", Wall Street Journal, Dec. 17, 2004.

Greenwald, John, "Battle for Remote Control", Time Archive, Mar. 1, 1995.

Hodge, Winston, "Architecture to Deliver Video on Demand", Electronic Business Buyer, Nov. 1994.

Jain, Sanjay K. et al, "Video on Demand: An Overview", A Central University, Feb. 2003.

Keough, Christopher, "Interactive TV Connection—Technology-Gold Pocket Interactive Acquires Mixed Signals Technologies", Los Angeles Business Journal, Mar. 4, 2002.

Leban, M. et al, "Internet Search for TV Content Based on TV Anytime", Sep. 22-24, 2003.

Lin, et al, "The Influence of Network Branding on Audience Affinity for Network Television", Advertising Research Foundation Feb. 2004.

Loizides, "Interactive TV: Dispelling Misconceptions in the Media", Acm Computers in Entertainment, vol. 3, No. 1, Article 7a, Jan. 2005.

Mermigas, Diane, "NBC Taking TV's Future by the Reins With On-Demand Content, Delivery", Television Week, Sep. 15, 2003.

Short, David, "A Quick Guide to Interactive Television", Broadcasting Engineering, Feb. 2005.

Srivastava, H.O., et al, "On-Line Broadcast Archives for Interactive Video", 1997.

Verhoeven, Jan L. et al, "System Architecture for Experimental Interactive Television", LogicaCMG Nederland B.V.

Waterman, David, "Internet TV: Business Models and Program Content", Dept. of Telecommunications Rradio and TV Center Sep. 2001.

"Building a Switched Broadcast network", Access Intelligence LLC Nov. 16, 2005.

"Building Dynamic Content for Set-Top Boxes", Sun Microsystems 1994-2005.

"Building the Perfect on Demand Beast: Television on Demand Presents a Dizzyling Array of Technology Options", Reed Business Information Nov. 3, 2003.

"Chips: Motorola's Scorpion Chip Turns TV Info Interactive Information Appliance", Work Group Computing Report Aug. 11, 1997.

"Columbia Tri-Star Television Distribution and Microsoft Sponsor Development Competition for Interactive Television", Microsoft Press Pass Jan. 25, 2000.

"EnReach Technology, Inc. Demonstrates Next Generation of Interactive Television with Innovative Open PVR Solution", EnReach Technology, Inc., PRNewswire.com, Sep. 1996-2006.

"Enter Video-on-Demand", Electronic News Aug. 31, 1998.

"Liberate Technologies Completes Assessment Aboard Scientific-Atlanta Explorer Set Tops and Digital Interactive Network", Liberate Technologies Press May 2, 2002.

"Next-Generation Digital Video Network; Intelligent IP Infrastructure Solutions for Cable Operators Offering VoD Services", Reed Business Information Feb. 2004.

"PBS Debuts Another First in Interactive Television; Wavexpress Selected to Provide Digital Broadcasting Platform", Market Wire Feb. 28, 2001.

"PENTV: BBC Achieves Significant Interactive TV Audiences with Open TV", Aug. 13, 2001.

"Set-Top Survival", Electronics Weekly May 22, 2002.

(56) References Cited

OTHER PUBLICATIONS

"Successfully Marketing Television on Demand: Operators, Programmers Look to Drive VOD Usage Through Promotions, Improved Navigation", Reed Business Information ISSN: 00072028, Nov. 22, 2004.

"Time Warner Introduces World's First Full Service Network in Orlando: Network offers First Digital Interactive Service Including Movies on Demand, Home Shopping and Interactive Games", Business Wire Dec. 14, 1994.

"Video on the Move", Reed Business Information Aug. 14, 2000.

"Worldgate Set to Deliver GO TV Links for Dynamic Interactive TV", Advanstar Communications, Inc., Oct. 22, 2002.

"http://www.nintendo.com/consumer/downloads/wave_english.pdf", 2003.

Berkowitz, Ben "Developers Interactinv With Sony Set-Top Box", Cable Worlds May 21, 2001.

Bissell, R.A. et al "The Set-Top Boxes for Interactive Services", BT Technology J., vol. 13, No. 4, Oct. 1995.

Carey, John "Contents and Service for the New Digital TV Environment".

Zollman, Peter M. "Interactive Television", Jan. 6, 2006.

Knightrider TV Intro Theme, IMDb.com, Inc.

Nintendo Gamecube™, WaveBird™ Wireless Controller, "http://www.nintendo.com/consumer/downloads/wave_english.pdf", Nintendo, 2003, 2 pages.

Fennis, B. et al., "Stay Tuned: We Will Be Back Right after These Messages": Need to Evaluate Moderates the Transfer of Irritation in Advertising, Journal of Advertising, vol. 30, No. 3 (Autumn, 2001), M. E. Sharpe, Inc., p. 15-25.

Ren, Xiaoyan et al., "Set-Top Survival," Electronics Weekly, May 22, 2002, Reed Business Information Limited, Issue 2053, p. 26-28.

\* cited by examiner

SYSTEM AND METHOD FOR PROVIDING INTERACTIVE MEDIA CONTENT OVER A NETWORK

FIELD OF THE INVENTION

The various embodiments of the invention disclosed herein relate generally to the field of interactive television. More particularly, these embodiments relate to providing interactive media content over a network.

BACKGROUND OF THE INVENTION

Advances in telecommunications and computing technology have led to the use of interactive television (TV) services on a large scale. Where such services are available, users are not only able to access television content by passively receiving it, but are also beginning to interact with the service providers by communicating requests and/or commands to the service providers. These requests and/or commands may be communicated to the service provider via the same path over which the programming services are provided or even via other paths.

Interactive television may be provided over any number of paths, including coaxial cable or optical fiber, hybrid fiber/coaxial, or any other suitable path that accommodates sufficient bandwidth for desired video channels as well as other telecommunications services. Content providers may include, for example, providers of over-the-air programming such as commercial television stations, cable programming such as weather, travel and entertainment channels, game channels, and other interactive services of various types.

Generally, TV service provides a user or users with a variety of options such as: traditional broadcast and cable television programming; video services, such as pay-per-view (PPV), near video-on-demand (NVOD), video-on-demand (VOD), promo channels, electronic program guides, etc.; cable delivered PC-based services; and interactive services through the use of a combination of compression and digital video technologies. TV services may also provide menuing capabilities and upstream signaling from users to service providers.

The combination of broadcast and interactive applications over interactive TV (e.g., interactive content) creates a possible mode of communication in which a user, if informed of the availability of alternate interactive content relating to a subject matter of interest, may invoke the alternate content to investigate that subject matter more thoroughly and according to his or her own tastes. However, television viewers, who are accustomed to choosing at will between the available transmitted channels with instantaneous results, will expect to be informed of the alternate content in a convenient and timely manner and to pass from one medium to another seamlessly.

SUMMARY OF THE INVENTION

A method and apparatus are described that provide interactive content over a network. According to one aspect of the present invention, a method for providing interactive content over a network comprises determining whether to inform one or more users of an interactive television service of available content from an Internet web site. Responsive to determining to inform the one or more users of the available content from an Internet web site, a hot key signal is generated indicating the availability and location of the alternate content. The hot key signal is inserted into a content signal transmitted to the one or more users from an interactive television service provider via a network with which the one or more users and the interactive television service provider are connected.

According to another aspect of the present invention, a system and method are provided for determining whether to supply alternate content to one or more users of an interactive television service, the alternate content to be cached on a terminal device located at a premises of the one or more users. Responsive to determining to supply alternate content to one or more users to an interactive television service, the alternate content is sent to the terminal device located at the premises of the one or more users. A hot key signal indicating availability of the alternate content is generated and inserted into a content signal transmitted to the one or more users from an interactive television service provider via a network with which the one or more users and the interactive television service provider are connected.

According to yet another aspect of the present invention, a system and method are provided for receiving a hot key signal indicating the availability and location of alternate content from an Internet web site. A determination is made whether the hot key signal is relevant to a user currently viewing content from an interactive television (TV) provider. Responsive to determining the hot key signal is relevant to the user, an indication that the hot key signal has been received is displayed on a screen. Responsive to receiving an indication that the hot key is accepted, a web browser is started to render the alternate content from an Internet web site indicated by the hot key signal.

According to yet another embodiment of the present invention a method and system are provided for caching alternate content on a terminal device of a user currently viewing content from an interactive television (TV) provider. A hot key signal is received indicating availability of alternate content cached on the user's terminal device. A determination is made whether the hot key signal is relevant to the user. Responsive to determining the hot key signal is relevant to the user, an indication that the hot key signal has been received is displayed on a screen. Responsive to receiving an indication that the hot key is accepted, the cached content is retrieved and presented to the user.

Other features of the present invention will be apparent from the accompanying drawings and from the detailed description that follows.

BRIEF DESCRIPTION OF THE DRAWINGS

The appended claims set forth the features of embodiments of the invention with particularity. The invention, together with its advantages, may be best understood from the following detailed description taken in conjunction with the accompanying drawings of which:

DETAILED DESCRIPTION OF THE INVENTION

In the following description, for the purposes of explanation, numerous specific details are set forth in order to provide a thorough understanding. It will be apparent, however, to one skilled in the art that embodiments of the present invention may be practiced without some of these specific details. In other instances, well-known structures and devices are shown in block diagram form.

Embodiments of the present invention include various processes, which will be described below. The processes may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, Compact Disk Read-Only Memories (CD-ROMs), and magneto-optical disks, Read-Only Memories (ROMs), Random Access Memories (RAMs), Erasable Programmable Read-Only Memories (EPROMs), Electronically Erasable Programmable Read-Only Memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

FIGS. 1A-1D illustrate a television displaying a picture containing a hot key for informing a user of available alternate content and redirecting the user to the alternate content responsive to selection of the embedded hot key according to one embodiment of the present invention. These figures represent respectively a process of viewing content, receiving a hot key, accepting a hot key, and redirecting to alternate content.

Figure 1C:
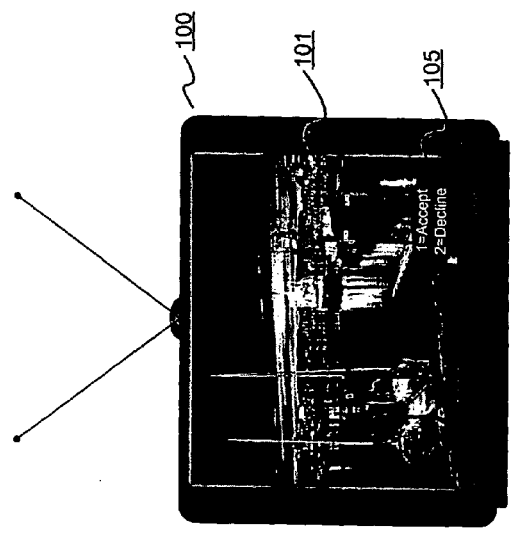
FIGS. 1A-1D illustrate a television displaying a picture containing a hot key for informing a user of available alternate content and redirecting the user to the alternate content responsive to selection of the embedded hot key according to one embodiment of the present invention.
Figure 1D:
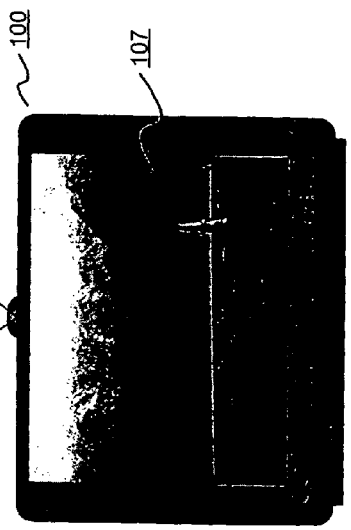
Figure 1A:
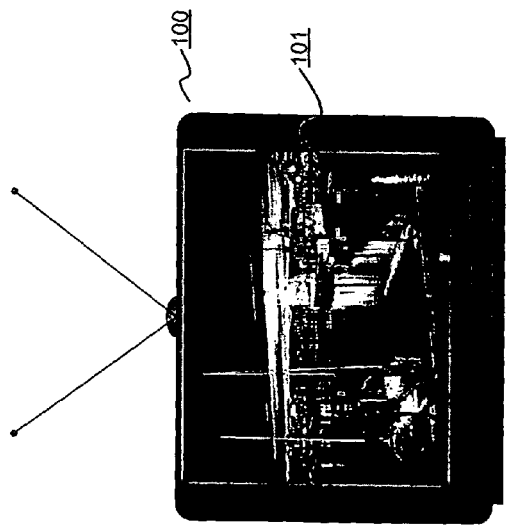

Specifically, FIG. 1A illustrates an example of viewing content. Here, a video program 101 is being displayed on television 100. Alternatively, a user may be viewing other types of interactive TV content such as pay-per-view video content, interactive games, etc.

Figure 1B:
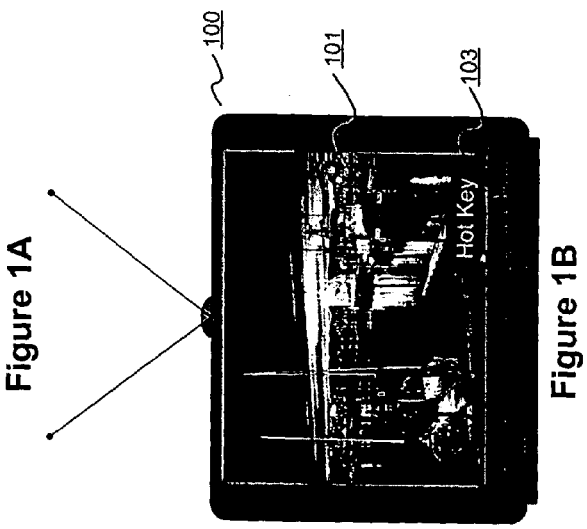

FIG. 1B illustrates an example of receiving a hot key. In this example, the user is tuned to the same video program 101 on television 100 as in the previous example of FIG. 1A. However, in this example an icon 103 or other graphic has been displayed to indicate to the user that a hot key has been received. The hot key indicates that alternate content is available for the user's consumption. According to one embodiment of the present invention, the alternate content may be in the form of another video program with content related to the video program 101 being viewed by the user.

FIG. 1C illustrates an example of accepting a hot key. In this example, the user is tuned to the same video program 101 as in FIGS. 1A and 1B. Icon 105, displayed to indicate to the user that a hot key has been received, now indicates a manner in which the user may accept or decline the alternate content. In this example, icon 105 indicates that the user may press 1 to accept the alternate content or 2 to decline the alternate content.

Of course, other methods of accepting or declining the alternate content may be used. For example, different single or even multiple buttons on a remote control may be pressed by the user to accept or decline the alternate content. According to one embodiment, a single "hot key button" may be present on the user's remote control that may be pressed by the user whenever a hot key icon is present on the television display. Pressing the hot key button may be a manner in which the user accepts the alternate content and is redirected to that content without further interaction from the user. According to another embodiment, the user may decline the alternate content by taking no action at all. That is, after some time period during which no action is taken by the user to accept the alternate content, the hot key may simply time out and expire. Various other methods of accepting or declining the alternate content may also be used.

Regardless of the exact operation used to accept the alternate content, FIG. 1D illustrates redirecting a user to alternate content responsive to the hot key being accepted. According to one embodiment of the present invention, the alternate content may be another video program with content related to the video program 101 being viewed by the user. Therefore, television 100 in FIG. 1D illustrates an alternate video program 107 being displayed. According to one embodiment of the present invention, the alternate video program 107 may present content related to the original content the user was viewing. For example, if the user was viewing a television program related to travel, the alternate video program may also be related to travel.

According to yet another embodiment of the present invention, the alternate video program may be commercial in nature. For example, the television program may be related to sports. In such a case, the alternate video program may be a pay-per-view sporting event of the same type or an advertisement for an upcoming pay-per-view event. In another example, the alternate video program may be an "infomercial" selling merchandise related to some aspect of the original video.

Therefore, content providers and/or service providers may be able to sell hot keys just as they currently sell time for commercial spots. For example, a provider of pay-per-view video content may wish to purchase from a content provider a hot key that redirects users to his content or an advertisement of upcoming events during a television program related to that content. Alternatively, content providers may charge users to receive a hot key service or even to block some or all hot key signals. Content providers and/or service providers may thus be able to realize an additional source of revenue.

As will be described below with reference to FIGS. 3-7, a system over which interactive television signals containing embedded hot key signals may be transmitted according to various embodiments of the present invention may be implemented over different types of networks. These different types of networks include, but are not limited to, cable, satellite, Fiber-to-the-Curb (FTTC), Fiber-to-the-House (FTTH), Very high speed Digital Subscriber Line (VDSL), and others.

FIGS. 2A-2D illustrate a television displaying a picture containing a hot key and redirecting a user to a web site responsive to selection of the embedded hot key according to one embodiment of the present invention. As in the previous example illustrated by FIGS. 1A-1D, FIGS. 2A-2D represent respectively a process of viewing content, receiving a hot key, accepting a hot key, and redirecting to alternate content. In this example, however, the alternate content is in the form of a web site on the Internet or other network.

Figure 2C:
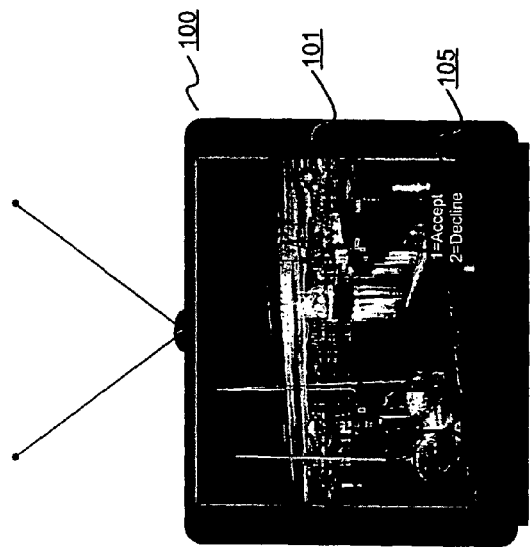
FIGS. 2A-2D illustrate a television displaying a picture containing a hot key and redirecting a user to a web site responsive to selection of the embedded hot key according to one embodiment of the present invention.
Figure 2D:
Figure 2A:
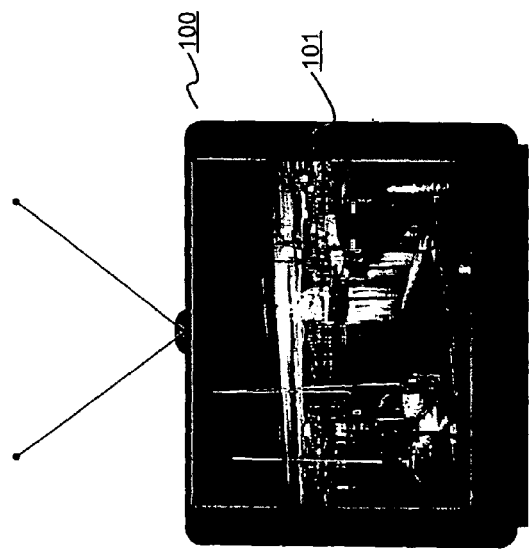

Specifically, FIG. 2A illustrates an example of viewing content. Here, a video program 101 is being displayed on television 100. Alternatively, a user may be viewing other types of interactive TV content such as pay-per-view video content, interactive games, etc.

Figure 2B:
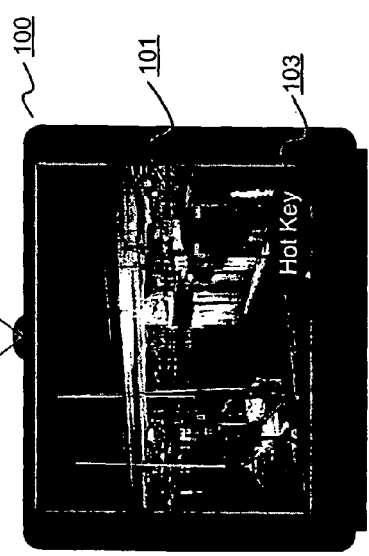

FIG. 2B illustrates an example of receiving a hot key. In this example, the user is tuned to the same video program 101 on television 100 as in the previous example of FIG. 2A. However, in this example an icon 103 or other graphic has been displayed to indicate to the user that a hot key has been received. The hot key indicates that alternate content is available for the user's consumption. According to one embodiment of the present invention, the alternate content may be in the form of a web site with content related to the video program 101 being viewed by the user.

FIG. 2C illustrates an example of accepting a hot key. In this example, the user is tuned to the same video program 101 as in FIGS. 2A and 2B. Icon 105, displayed to indicate to the user that a hot key has been received, now indicates a manner in which the user may accept or decline the alternate content. In this example, icon 105 indicates that the user may press 1 to accept the alternate content or 2 to decline the alternate content.

Of course, other methods of accepting or declining the alternate content may be used. For example, different single or even multiple buttons on a remote control may be pressed by the user to accept or decline the alternate content. According to one embodiment, a single "hot key button" may be present on the user's remote control that may be pressed by the user whenever a hot key icon is present on the television display. Pressing the hot key button may be a manner in which the user accepts the alternate content and is redirected to that content without further interaction from the user. According to another embodiment, the user may decline the alternate content by taking no action at all. That is, after some time period during which no action is taken by the user to accept the alternate content, the hot key may simply time out and expire. Various other methods of accepting or declining the alternate content may also be used.

Regardless of the exact operation used to accept the alternate content, FIG. 2D illustrates redirecting a user to alternate content responsive to the hot key being accepted. According to one embodiment of the present invention, the alternate content may be in the form of a web site on the Internet or another network. Therefore, FIG. 2D illustrates a web site 107 being displayed on television 100. According to one embodiment of the present invention, the web site may present content related to the original content the user was viewing. For example, if the user was viewing a television program related to travel, the alternate content web site may also be related to travel.

According to yet another embodiment of the present invention, the alternate content web site may be commercial in nature. For example, as described above, the television program may be related to travel. In such a case, the alternate content web site may be that of a travel agent or airline. In another example, the television program may be a sporting event and the alternate content web site may be selling merchandise related to one or both of the teams playing.

Therefore, content providers and/or service providers may be able to sell hot keys just as they currently sell time for commercial spots. For example, an owner of a web site such as a travel agent may wish to purchase from a content provider a hot key that redirects users to his site during a television program related to travel. Alternatively, content providers may charge users to receive a hot key service or even to block some or all hot key signals. Content providers and/or service providers may thus be able to realize an additional source of revenue.

Figure 3:
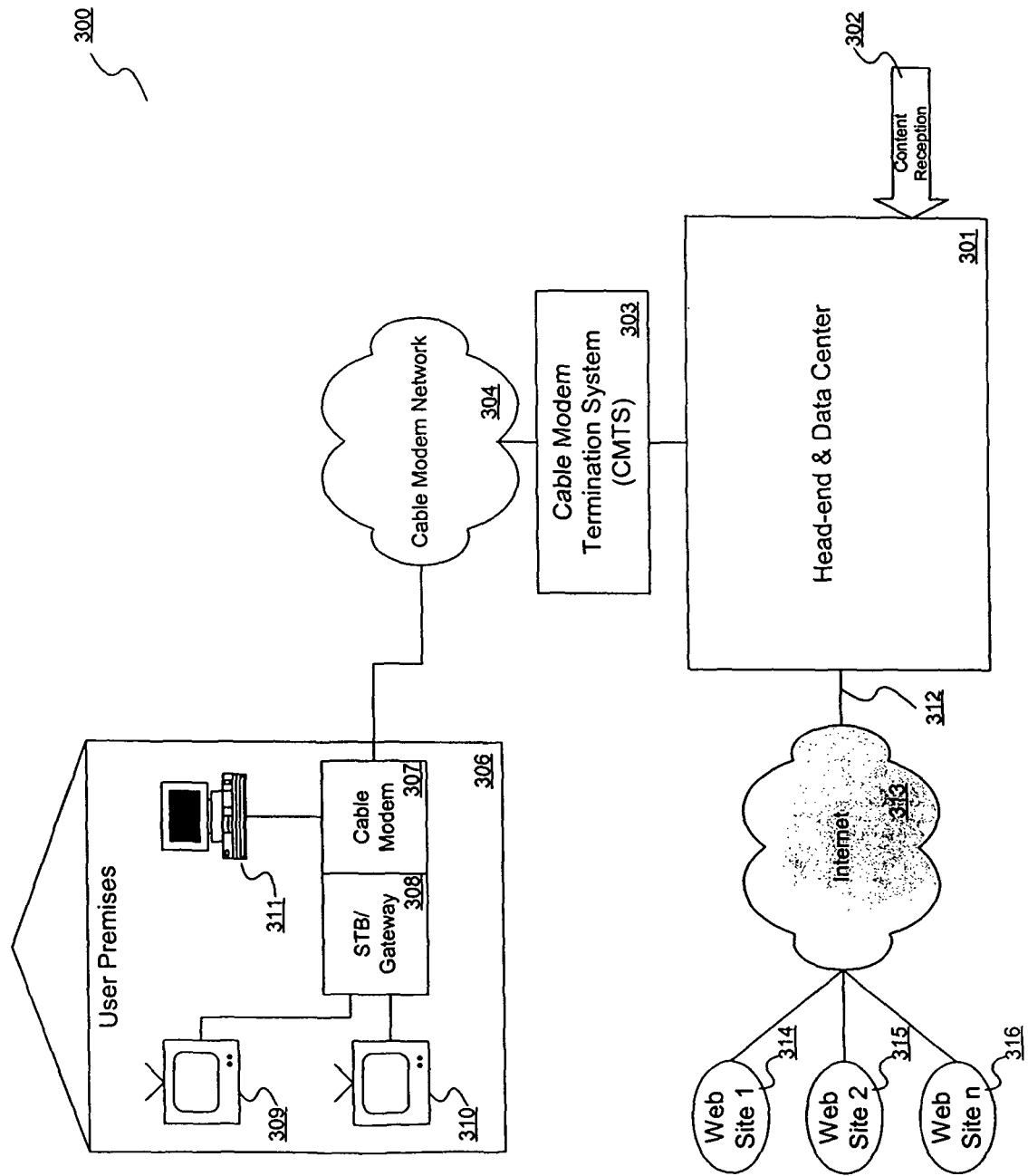
FIG. 3 is a block diagram illustrating a cable network over which interactive television signals containing embedded hot key signals may be transmitted according to one embodiment of the present invention.

FIG. 3 is a block diagram illustrating a cable network over which interactive television signals containing embedded hot key signals may be transmitted according to one embodiment of the present invention. This example illustrates, at a high-level, an architecture of a service provider's system 300 that includes head-end and data center 301, Cable Modem Termination System (CMTS) 303, cable modem network 304, and user premises 306 that also contains cable modem 307, Set Top Box (STB)/Gateway 308, one or more televisions 309 and 310, and possibly other devices such as personal computer (PC) 311.

An interactive TV service provider typically operates and maintains a head-end and data center 301 equipped to receive signals 302 from one or more content providers. Content Providers may be any original or secondary source of programming or information generally including, for example, interactive or non-interactive over-the-air programming such as commercial television stations, cable programming such as weather, travel and entertainment channels, game channels, and other interactive services of various types. Head-end and data center 301, after receiving content from one or more content providers, may then transmit the interactive content to user premises 306. Further details of the hardware comprising the head-end and data center 301 as well as the processing performed therein will be discussed below with reference to FIGS. 8 through 10.

According to one embodiment of the present invention, hot key signals indicating the availability of alternate content may be provided to head-end and data center 301 along with and embedded in interactive TV signals 302 from the content providers. For example, the hot key signals may be generated at the content provider's location by an operations team when preparing and scheduling content for transmission to various service providers. As will be discussed below, interactive TV signals with these embedded hot key signals are transmitted from head-end and data center 301 and are received and used by STB/gateway 308 or PC 311 at user premises 306 to inform the user of the availability of alternate content and to guide the user to this content if he chooses to accept it. Details of the hot key signals will be discussed below with reference to FIG. 11.

According to another embodiment of the present invention, hot key signals indicating the availability of alternate content may be generated at head-end and data center 301. For example, the hot key signals may be generated at head-end and data center 301 by an operations team when preparing and scheduling content for transmission to users. As will be discussed below, these embedded hot key signals are transmitted from head-end and data center 301 and are received and used by STB/gateway 308 or PC 311 at user premises 306 to inform the user of the availability of alternate content and to guide the user to this content if he chooses to accept it.

In the example illustrated in FIG. 3, a signal carrying interactive TV content is transmitted from head-end and data center 301 through CMTS 303 and onto cable modem network 304. Typically, transmissions over cable modem network 304 may be made in a digital form. For example, the content may be transmitted as a Motion Pictures Experts Group Standard 2 (MPEG-2) data stream using a network protocol such as Internet Protocol (IP). Therefore, the content may be transmitted from head-end and data center 301 as IP data packets or in another similar format. One possible example of such a packet will be discussed below with reference to FIG. 11.

Regardless of the format of the transmission, a signal carrying the interactive TV content is received at user premises 306 via cable modem 307. Connected with cable modem 307 may be some form of terminal device. In the example illustrated by FIG. 3, two possible types of terminal devices, STB/Gateway 308 and PC 311 are shown. The terminal device, STB, Gateway, PC or other device, performs functions such as exchanging messages (including video-related data) over a network with head-end and data center 301, receiving messages from a user input device, such as a handheld remote control unit or keyboard, translating video signals from a network-native format into a format that can be used by televisions 309 and 310 or other display devices, and providing a video signal to televisions 309 and 310 or other display devices. STB/Gateway 308 and PC 311 may also be capable of performing other functions, such as inserting alphanumeric or graphical information into the video stream in order to "overlay" that information on the video image, providing graphic or audio feedback to a user, or routing a traditional transmitted signal to a viewing device to which another STB is connected. Additional details of the hardware of STB/Gateway 308 and the processing performed therein will be discussed below with reference to FIGS. 12 through 14.

In use, STB/Gateway 308 or PC 311 may receive hot key signals embedded in the interactive TV signals by either the content providers or the service provider. STB/Gateway 308 or PC 311 may then notify the user of available alternate content as discussed above with reference to FIGS. 1A-1D and 2A-2D. STB/Gateway 308 or PC 311 may then receive some form of user feedback indicating that the user accepts or declines the alternate content. If the user accepts the alternate content, STB/Gateway 308 or PC 311 may then redirect the user to this alternate content as will be discussed further below with reference to FIGS. 13 and 14.

According to one embodiment of the present invention, head-end and data center 301 may also be connected with the Internet 313 or other network via a high-speed connection 312 such as a fiber optic connection to provide access to a number of web sites 314-316. Through this connection 312, head-end and data center 301 may supply alternate content to users from one or more of the number of web sites 314-316.

Figure 4:
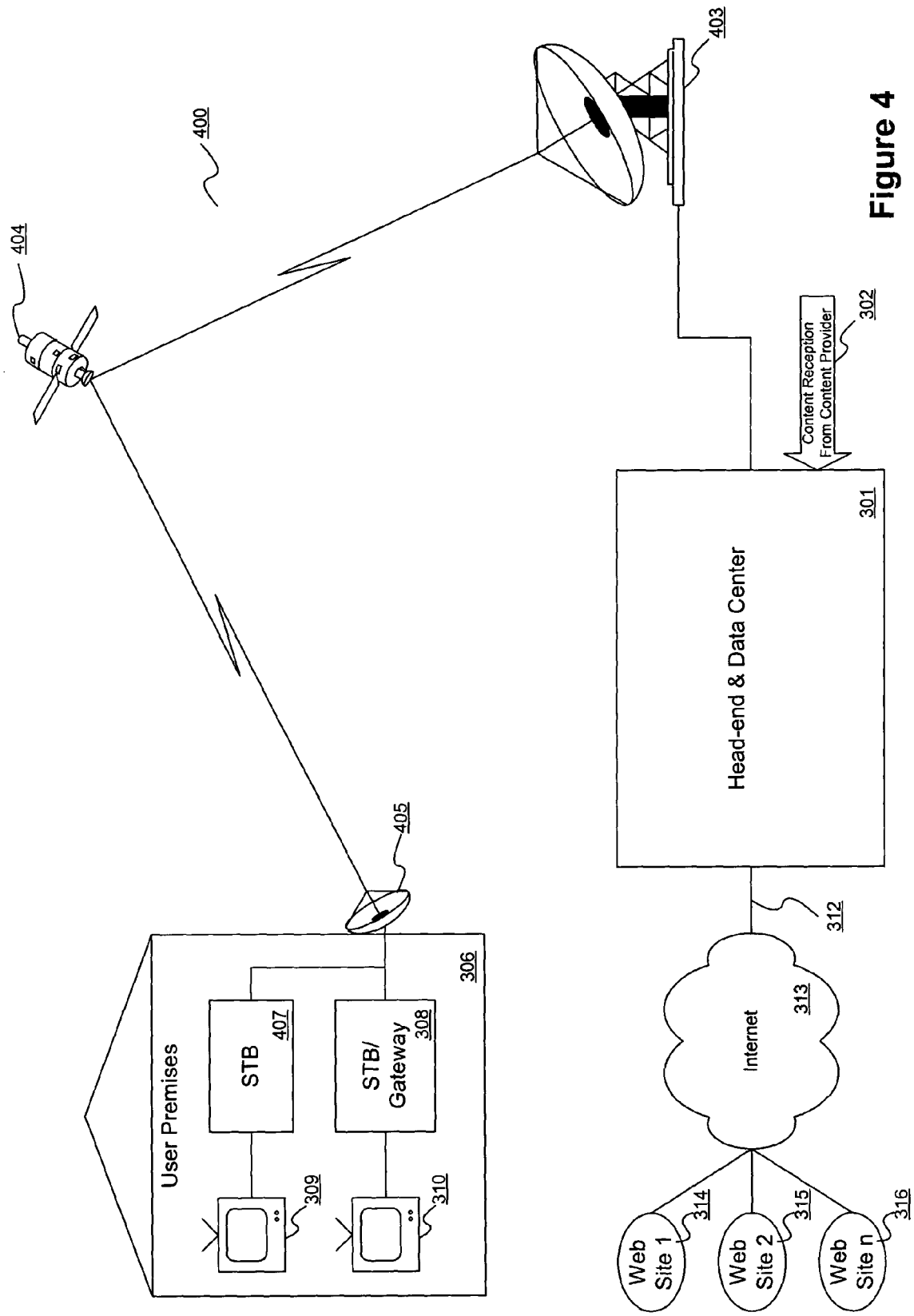
FIG. 4 is a block diagram illustrating a satellite network over which interactive television signals containing embedded hot key signals may be transmitted according to one embodiment of the present invention.

FIG. 4 is a block diagram illustrating a satellite network over which interactive television signals containing embedded hot key signals may be transmitted according to one embodiment of the present invention. This example illustrates a high-level view of an architecture of a service provider's system 400 that includes head-end and data center 301, satellite transmitter 403, satellite 404, and satellite receiver 405 on user premises 306 that also contains one or more Set-Top Boxes (STBs) and/or gateways 407 and 308 as well as one or more televisions 309 and 310 or other content viewing devices.

Head-end and data center 301 is equipped to receive signals 302 from one or more content providers. Head-end and data center 301, after receiving content from one or more content providers, may then transmit the interactive content to user premises 306. Further details of the hardware comprising the head-end and data center 301 as well as the processing performed therein will be discussed below with reference to FIGS. 8 through 10.

According to one embodiment of the present invention, hot key signals indicating the availability of alternate content may be provided to head-end and data center 301 along with and embedded in signals 302 from the content providers. Alternatively, hot key signals indicating the availability of alternate content may be generated at head-end and data center 301. As will be discussed below, interactive TV signals with these embedded hot key signals are transmitted from head-end and data center 301 and are received and used by STBs and/or gateways 407 and 308 at user premises 306 to inform the user of the availability of alternate content and to guide the user to this content if he chooses to accept it. Details of the hot key signals will be discussed below with reference to FIG. 11.

In the example illustrated in FIG. 4, content is transmitted, via a modulated carrier, from head-end and data center 301 through satellite transmitter 403. Satellite 404, in geosynchronous orbit, receives and re-transmits the modulated carrier signal to satellite receiver 405 located at user premises 306. Transmissions from the satellite transmitter 403 may be made in a digital form. For example, the content may be transmitted as an MPEG-2 data stream using a network protocol such as IP. Therefore the content may be transmitted from head-end and data center 301 as IP data packets or in another similar format. One possible example of such a packet will be discussed below with reference to FIG. 11.

Regardless of the format of the transmission, a signal carrying the interactive TV content is received at user premises 306. The signal is received and processed by some form of terminal device. In the example illustrated by FIG. 4, two possible types of terminal devices, STB 407 and STB/Gateway 308 are shown. The terminal device, STB, Gateway or similar device, performs various functions as described above. Additional details of the hardware of the STB 407 and STB/Gateway 308 and the processing performed therein will be discussed below with reference to FIGS. 12 through 14.

In use, STB 407 or STB/Gateway 308 may receive hot key signals embedded in the interactive TV signals by either the content providers or the service provider. STB 407 or STB/Gateway 308 may then notify the user of available alternate content through televisions 309 and 310 as discussed above with reference to FIGS. 1A-1D and 2A-2D. STB 407 or STB/Gateway 308 may then receive some form of user feedback indicating that the user accepts or declines the alternate content. If the user accepts the alternate content, STB 407 or STB/Gateway 308 may then redirect the user to this alternate content as will be discussed further below with reference to FIGS. 13 and 14.

According to one embodiment of the present invention, head-end and data center 301 may also be connected with the Internet 313 or other network via a high-speed connection 312 such as a fiber optic connection to provide access to a number of web sites 314-316. Through this connection 312, head-end and data center 301 may supply alternate content to users from one or more of the number of web sites 314-316.

Figure 5:
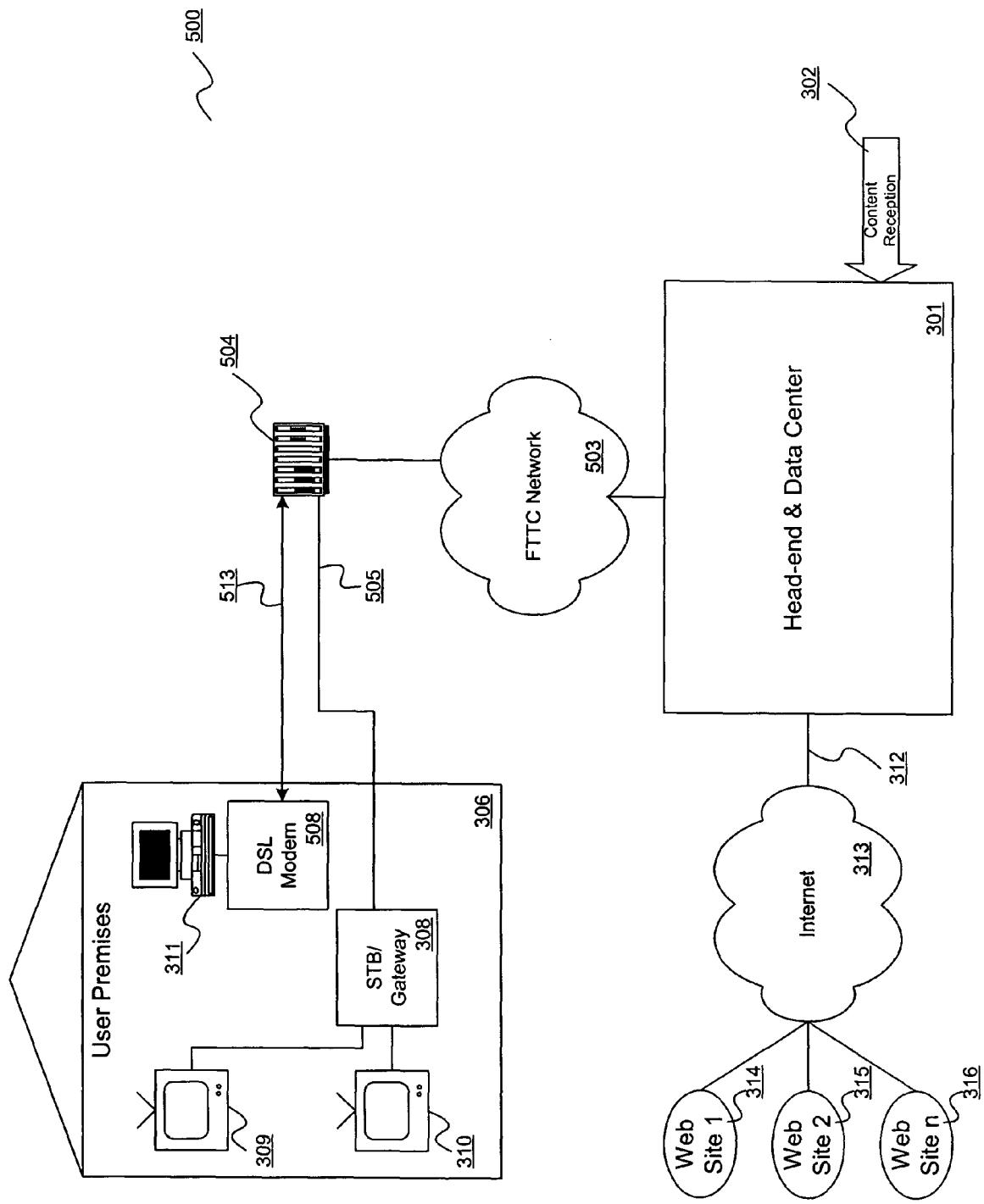
FIG. 5 is a block diagram illustrating a Fiber-to-the-Curb (FTTC) network over which interactive television signals containing embedded hot key signals may be transmitted according to one embodiment of the present invention.

FIG. 5 is a block diagram illustrating a Fiber-to-the-Curb (FTTC) network over which interactive television signals containing embedded hot key signals may be transmitted according to one embodiment of the present invention. This example illustrates a high-level view of an architecture of a service provider's system 500 that includes head-end and data center 301, FTTC network 503, pedestal 504, and user premises 306 that also contains STB/Gateway 308 connected with one or more televisions 309 and 310 or other content viewing devices and Digital Subscriber Line (DSL) modem 508 connected with PC 311.

Head-end and data center 301 is equipped to receive signals 302 from one or more content providers. Head-end and data center 301, after receiving content from one or more content providers, may then transmit the interactive content to subscriber premises 306. Further details of the hardware comprising the head-end and data center 301 as well as the processing performed therein will be discussed below with reference to FIGS. 8 through 10.

According to one embodiment of the present invention, hot key signals indicating the availability of alternate content may be provided to head-end and data center 301 along with and embedded in signals 302 from the content providers. Alternatively, hot key signals indicating the availability of alternate content may be generated at head-end and data center 301. The interactive TV signals with embedded hot key signals are transmitted from head-end and data center 301 to user premises 306 to inform the user of the availability of alternate content and to guide the user to this content if he chooses to accept it. Details of the hot key signals will be discussed below with reference to FIG. 11.

In the example illustrated in FIG. 5, content is transmitted from head-end and data center 301 over FTTC network 503. Pedestal 504, located in relatively close geographic proximity to a group of users, is connected with FTTC network 503. Pedestal 504 receives transmissions from FTTC network 503 and may re-transmit them via a coaxial cable 505 to STB/Gateway 308 located at the user premises 306. Similarly, pedestal 504 may retransmit content received from FTTC network 503 over a copper wire twisted pair 513 to DSL modem 508. Transmissions over the FTTC network 503 may be made in a digital form. For example, the content may be transmitted as an MPEG-2 data stream using a network protocol such as IP. Therefore, the content may be transmitted from head-end and data center 301 as IP data packets or in another similar format. One possible example of such a packet will be discussed below with reference to FIG. 11.

Regardless of the format of the transmission, a signal carrying the interactive TV content is received at user premises 306. The signal is received and processed by some form of terminal device. In the example illustrated by FIG. 5, two possible types of terminal devices, STB/Gateway 308 and PC 311 with DSL modem 508 are shown. The terminal device, STB, Gateway or similar device, performs various functions as described above. Additional details of the hardware of the STB/Gateway 308 and the processing performed therein will be discussed below with reference to FIGS. 12 through 14.

In use, STB/Gateway 308 or PC 311 with DSL modem 508 may receive hot key signals embedded in the interactive TV signals by either the content providers or the service provider. STB/Gateway 308 or PC 311 with DSL modem 508 may then notify the user of available alternate content through televisions 309 and 310 or PC 311 as discussed above with reference to FIGS. 1A-1D and 2A-2D. STB/Gateway 308 or PC 311 may then receive some form of user feedback indicating that the user accepts or declines the alternate content. If the user accepts the alternate content, STB/Gateway 308 or PC 311 may then redirect the user to this alternate content as will be discussed further below with reference to FIGS. 13 and 14.

According to one embodiment of the present invention, head-end and data center 301 may also be connected with the Internet 313 or other network via a high-speed connection 312 such as a fiber optic connection to provide access to a number of web sites 314-316. Through this connection 312, head-end and data center 301 may supply alternate content to users from one or more of the number of web sites 314-316.

Figure 6:
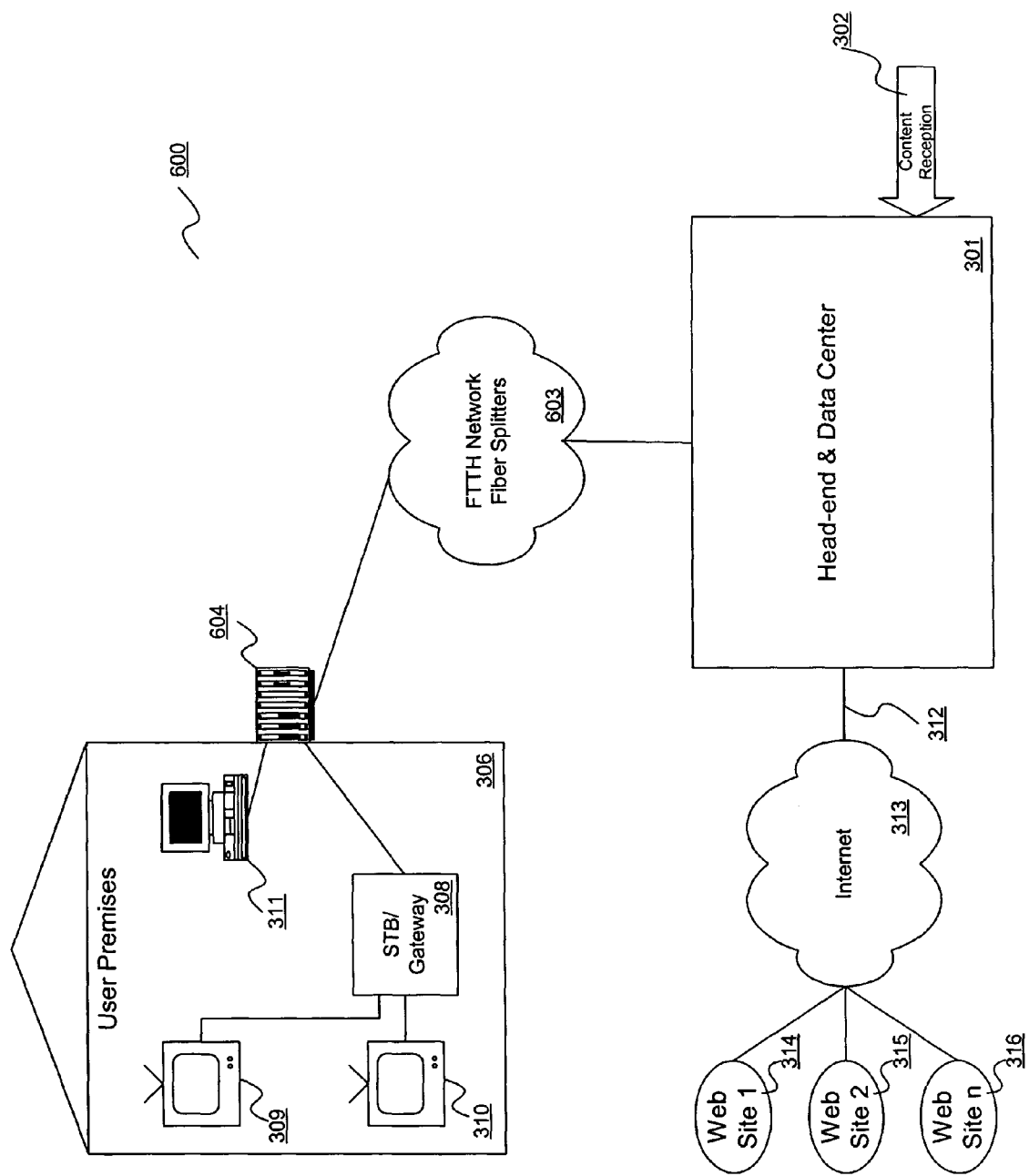
FIG. 6 is a block diagram illustrating a Fiber-to-the-Home (FTTH) network over which interactive television signals containing embedded hot key signals may be transmitted according to one embodiment of the present invention.

FIG. 6 is a block diagram illustrating a Fiber-to-the-Home (FTTH) network over which interactive television signals containing embedded hot key signals may be transmitted according to one embodiment of the present invention. This example illustrates, at a high-level, an architecture of a service provider's system 600 that includes head-end and data center 301, FTTH network 603, Optical Network Unit (ONU) 604, and user premises 306 that also contains STB/Gateway 308 connected with one or more televisions 309 and 310 or other content viewing devices such as PC 311.

Head-end and data center 301 is equipped to receive signals 302 from one or more content providers. Head-end and data center 301, after receiving content from one or more content providers, may then transmit the interactive content to user premises 306. Further details of the hardware comprising the head-end and data center 301 as well as the processing performed therein will be discussed below with reference to FIGS. 8 through 10.

According to one embodiment of the present invention, hot key signals indicating the availability of alternate content may be provided to head-end and data center 301 along with and embedded in signals 302 from the content providers. Alternatively, hot key signals indicating the availability of alternate content may be generated at head-end and data center 301. The interactive TV signals with embedded hot key signals are transmitted from head-end and data center 301 to user premises 306 to inform the user of the availability of alternate content and to guide the user to this content if he chooses to accept it. Details of the hot key signals will be discussed below with reference to FIG. 11.

In the example illustrated in FIG. 6, content is transmitted from head-end and data center 301 over FTTH network 603. ONU 604, located at user premises 306, is connected with FTTH network 603. ONU 604 receives transmissions from FTTH network 603 and re-transmits them to STB/Gateway 308 and PC 311 located at the user premises 306.

Transmissions over the FTTC network 603 may be made in a digital form. For example, the content may be transmitted as a MPEG-2 data stream using a network protocol such as IP. Therefore the content may be transmitted from head-end and data center 301 as IP data packets or in another similar format. One possible example of such a packet will be discussed below with reference to FIG. 11.

Regardless of the format of the transmission, a signal carrying the interactive TV content is received at user premises 306. The signal is received and processed by STB/Gateway 308 and PC 311. Additional details of the hardware of the STB/Gateway 308 and PC 311 and the processing performed therein will be discussed below with reference to FIGS. 12 through 14.

In use, STB/Gateway 308 or PC 311 may receive hot key signals embedded in the interactive TV signals by either the content providers or the service provider. STB/Gateway 308 or PC 311 may then notify the user of available alternate content through televisions 309 and 310 or PC 311 as discussed above with reference to FIGS. 1A-1D and 2A-2D. STB/Gateway 308 or PC 311 may then receive some form of user feedback indicating that the user accepts or declines the alternate content. If the user accepts the alternate content, STB/Gateway 308 or PC 311 may then redirect the user to this alternate content as will be discussed further below with reference to FIGS. 13 and 14.

According to one embodiment of the present invention, head-end and data center 301 may also be connected with the Internet 313 or other network via a high-speed connection 312 such as a fiber optic connection to provide access to a number of web sites 314-316. Through this connection 312, head-end and data center 301 may supply alternate content to users from one or more of the number of web sites 314-316.

Figure 7:
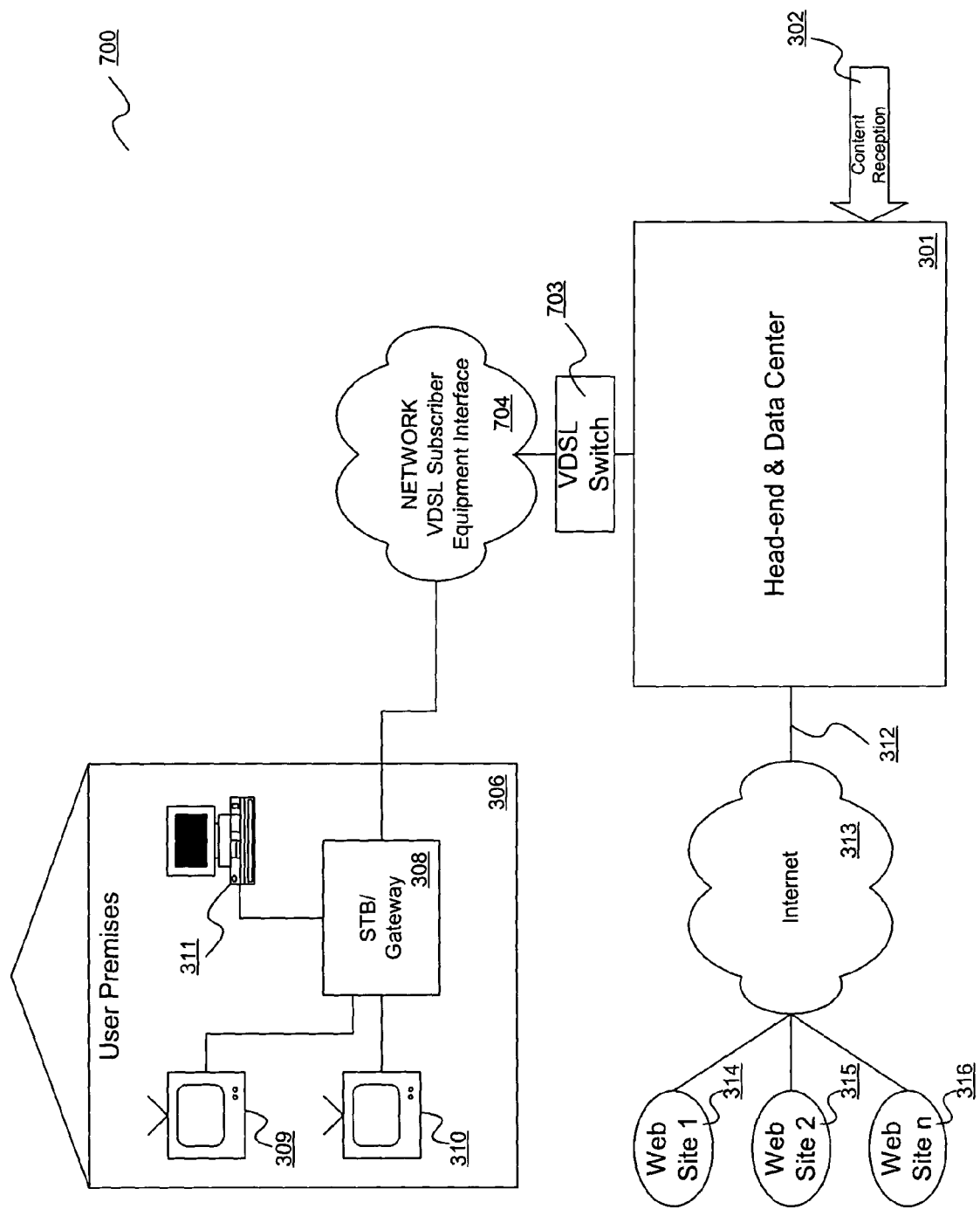
FIG. 7 is a block diagram illustrating a Very high-speed Digital Subscriber Line (VDSL) network over which interactive television signals containing embedded hot key signals may be transmitted according to one embodiment of the present invention.

FIG. 7 is a block diagram illustrating a Very high-speed Digital Subscriber Line (VDSL) network over which interactive television signals containing embedded hot key signals may be transmitted according to one embodiment of the present invention. This example illustrates, at a high-level, an architecture of a service provider's system 700 that includes head-end and data center 301, VDSL switch 703, network 704, and user premises 306 that contains STB/Gateway 308, one or more televisions 309 and 310, and optionally PC 311.

Head-end and data center 301 is equipped to receive signals 302 from one or more content providers. Head-end and data center 301, after receiving content from one or more content providers, may then transmit the interactive content to user premises 306. Further details of the hardware comprising the head-end and data center 301 as well as the processing performed therein will be discussed below with reference to FIGS. 8 through 10.

According to one embodiment of the present invention, hot key signals indicating the availability of alternate content may be provided to head-end and data center 301 along with and embedded in signals 302 from the content providers. Alternatively, hot key signals indicating the availability of alternate content may be generated at head-end and data center 301. As will be discussed below, these embedded hot key signals are transmitted from head-end and data center 301 and are received and used by STB/Gateway 308 at user premises 306 to inform the user of the availability of alternate content and to guide the user to this content if he chooses to accept it. Details of the hot key signals will be discussed below with reference to FIG. 11.

In the example illustrated in FIG. 7, content is transmitted from head-end and data center 301 through VDSL switch 703. VDSL switch 703 transmits the content across network 704 to user premises 306. Transmissions from head-end and data center 301 may be made in a digital form using a network protocol such as Internet Protocol (IP). Therefore the content may be transmitted from head-end and data center 301 as IP data packets or in another similar format. One possible example of such a packet will be discussed below with reference to FIG. 11.

Regardless of the format of the transmission, a signal carrying the interactive TV content is received at user premises 306. The signal may be received and processed by some form of terminal device such as STB/Gateway 308. Additional details of the hardware of the STB/Gateway 308 and the processing performed therein will be discussed below with reference to FIGS. 12 through 14.

In use, STB/Gateway 308 may receive hot key signals embedded in the interactive TV signals by either the content providers or the service provider. STB/Gateway 308 may then notify the user of available alternate content through televisions 309 and 310 or PC 311 as discussed above with reference to FIGS. 1A-1D and 2A-2D. STB/Gateway 308 may then receive some form of user feedback indicating that the user accepts or declines the alternate content. If the user accepts the alternate content, STB/Gateway 308 may then redirect the user to this alternate content as will be discussed further below with reference to FIGS. 13 and 14.

According to one embodiment of the present invention, head-end and data center 301 may also be connected with the Internet 313 or other network via a high-speed connection 312 such as a fiber optic connection to provide access to a number of web sites 314-316. Through this connection 312, head-end and data center 301 may supply alternate content to users from one or more of the number of web sites 314-316.

Figure 8:
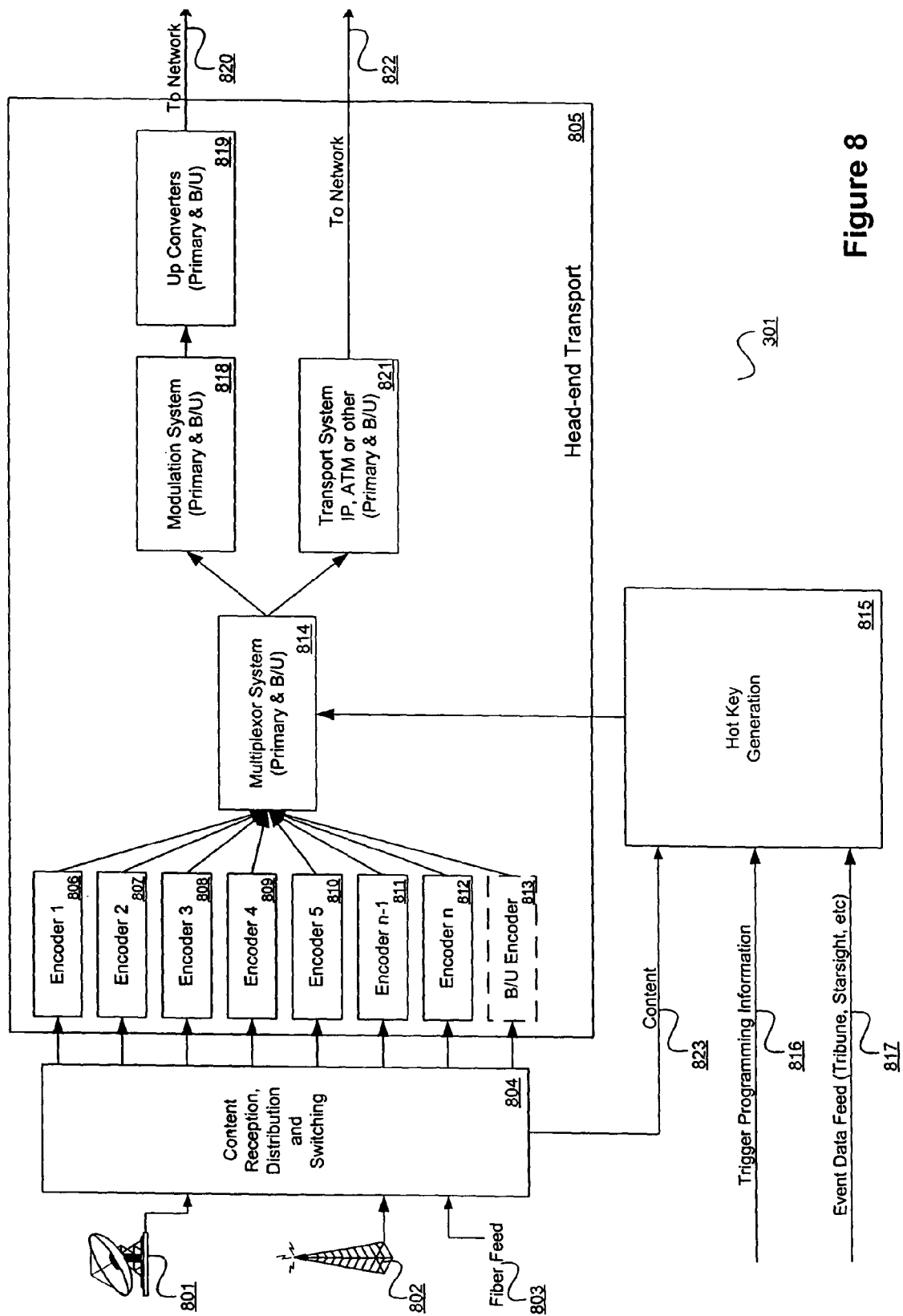
FIG. 8 is a block diagram of a head-end and data center system where hot key signals may be added to a transmitted signal according to one embodiment of the present invention.

FIG. 8 is a block diagram illustrating a head-end and data center system where hot key signals may be added to a transmitted signal according to one embodiment of the present invention. This example illustrates head-end and data center system 301 comprising content reception, distribution, and switching portion 804, head-end transport portion 805, and hot key generation system 815.

Content reception, distribution, and switching portion 804 is connected with one or more of satellite receiver 801, over the air broadcast receiver 802, fiber optical feed 803, and other types of links (not shown) to receive signals from one or more content providers. Content reception, distribution, and switching portion 804 comprises equipment that that is commonly used to receive transmitted signals, demodulate the transmitted signals to separate the content signals from a carrier signal if necessary, distribute and arrange the content from the content providers to fit a programming schedule of the service provider, and provide switching of these signals between the various components of the head-end and data center 301.

Head-end transport portion 805 comprises a plurality of encoders 806-812, optional back-up encoder 813, multiplexor system 814, modulation system 818, up converters 819, and transport system 821. Encoders 805-812 and optional back-up encoder 813 receive interactive TV content signals from content reception, distribution, and switching portion 804 and encode the content signals into any of a variety of well known formats such as Motion Pictures Experts Group Standard 2 (MPEG-2), Motion Pictures Experts Group Standard 4 (MPEG-4), DivX, or any other format. Encoders 805-812 and optional back-up encoder 813 each provide an individual encoded data stream representing the content signal of a single channel to multiplexor system 814.

Hot key generation system 815 is also connected with multiplexor system 814 of head-end transport 805. Hot key generation system 815 receives content 823 from content reception, distribution, and switching portion 804, trigger programming information 816, and event data feed 817. Trigger programming information 816 provides an indication of the time, date, etc. that given content will be played out. Event data feed 817 provides live content rather than content that is programmed and played out at a scheduled time. Using content 823, trigger programming information 816, and event data feed 817 hot key generation system 815 generates hot key signals associated with content to be transmitted from head-end and data center 301 and outputs the hot key signals to multiplexor system 814. Exemplary processes for generating hot key signals as may be performed by hot key generation system 815 will be discussed below with reference to FIGS. 9 and 10.

Multiplexor system 814 may comprise a primary as well as an optional back-up multiplexor. Multiplexor system 814 combines the encoded content signals from encoders 805-812 and optional back-up encoder 813 and hot key signals from hot key generation system 815 to provide an output data stream. The output stream of multiplexor system 814 comprises the individual encoded data streams representing the content signals of the individual channels as well as any associated hot key signals.

The output stream of multiplexor system 814 may be applied to a modulation system 818. Modulation system 818 may comprise a primary as well as an optional back-up modulator. Modulation system 818 uses the output data stream of multiplexor system 814 to modulate a carrier frequency for transmission from the head-end system 301.

Modulation system 818 supplies the modulated carrier signal to up converters 819. Up converters 819 may comprise primary as well as optional back-up converters. Additionally, up converters 819 may comprise multiple stages of converters. The function of up converters 819 is to increase the modulated carrier frequency to a range that is suitable for transmission. Up converters 819 then transmitted the modulated carrier signal from head-end and data center 301 via network 820 to users.

Optionally, or in addition to modulation system 818, the output of multiplexor system 814 may be applied to transport system 821 that may comprise a primary as well as an optional back-up transport system. The function of the transport system 821 is to prepare the output stream of multiplexor system 814 for transmission over network 822. That is, transport system 821 places the output stream of multiplexor system 814 into a format and protocol appropriate for network 822. For example, the output stream of multiplexor system may be placed into Internet Protocol (IP) packets or placed into an Asynchronous Transfer Mode (ATM) channel by transport system 821.

Figure 9:
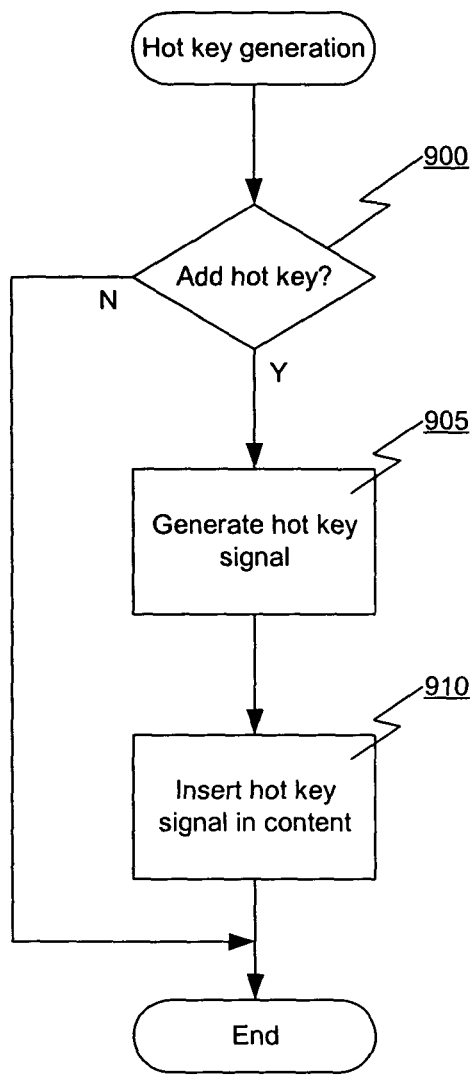
FIG. 9 is a flowchart illustrating head-end and data center processing for adding hot key signals to a transmitted signal according to one embodiment of the present invention.

FIG. 9 is a flowchart illustrating head-end and data center processing for adding hot key signals to a transmitted signal according to one embodiment of the present invention. This process may be performed by a system such as the hot key generation system of the head-end and data center described above with reference to FIG. 8 or any other system with similar capabilities.

First, at decision block 900, the system determines whether a hot key signal should be added to the current content. This determination may be made by a local television operator such as a decision to provide a hot key on a local advertisement that gives the user the opportunity to find out more about a local product. Alternatively, this determination may be made by an original national content provider such as a national network to provide a hot key to all users or to users living in a certain state or region. In either case, this determination may be based, for example, on the results of an automated search of Internet sights using search parameters related to the original content. For example, the search may be based on the title, type, genre, or category of the content or more specific information like a specific name of an actor in a movie.

If a hot key signal is to be added to the current content, the hot key signal may be generated at processing block 905. According to one embodiment of the present invention, the hot key signal may comprise a special purpose Internet Protocol (IP) packet as described below with reference to FIG. 11. Alternatively, the hot key signal may be any other type of digital signal or packet suitable for transmission over the type of network being used and capable of carrying information similar to that shown in FIG. 11.

Finally, at processing block 905, the hot key signal is inserted into the content signal. That is, the hot key IP packet or other signal is multiplexed with the content data stream as described above with reference to FIG. 8.

According to one embodiment of the present invention, alternate content may be pre-loaded or cached on the user's equipment prior to transmission of the hot key signal. That is, the head-end and data center may first send available alternate content to the user's equipment such as an STB or gateway. The user's equipment may cache the alternate content on a hard drive or other large capacity storage device. Once the alternate content is cached, a hot key informs the user of the availability of the content. The user may then view the content, reject the content, choose to view the content at a later time, or other possible options.

Figure 10:
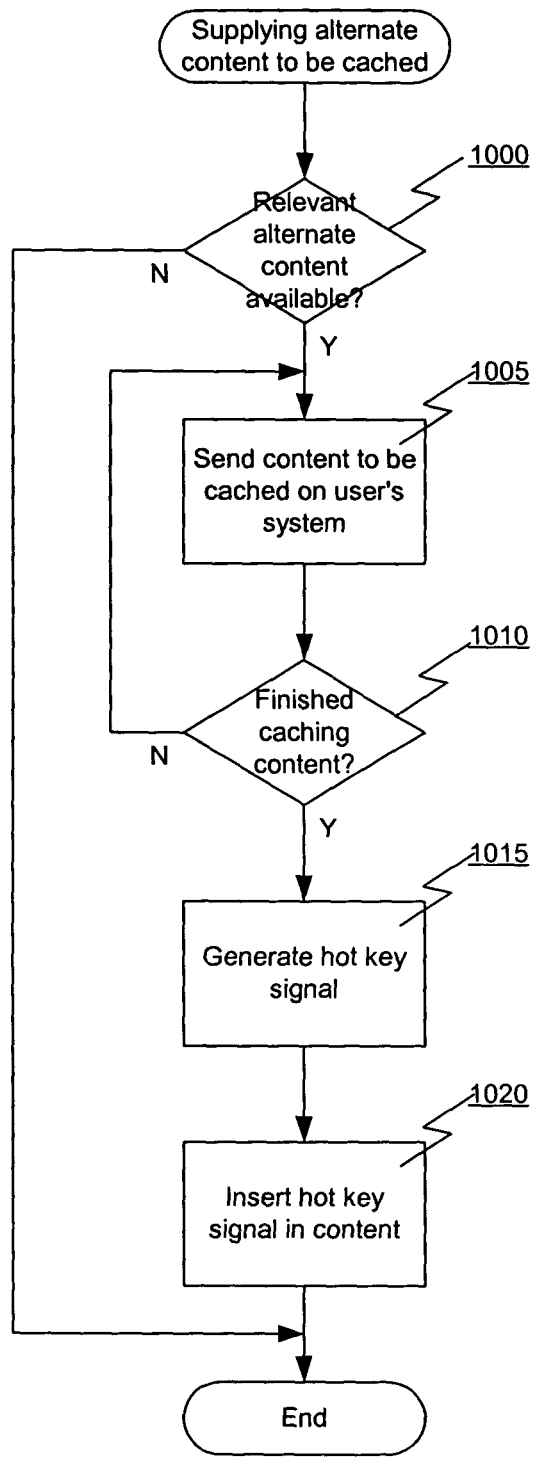
FIG. 10 is a flowchart illustrating head-end and data center processing for caching content on a user's system and adding hot key signals to a transmitted signal according to one embodiment of the present invention.

FIG. 10 is a flowchart illustrating head-end and data center processing for caching content on a user's system and adding hot key signals to a transmitted signal according to one embodiment of the present invention. This process may be performed by a system such as the hot key generation system of the head-end and data center described above with reference to FIG. 8 or any other system with similar capabilities.

First, at decision block 1000, a determination is made whether there is relevant alternate content available for current content. This determination may be made by an operations team when scheduling or otherwise preparing content for transmission to users. For example, when preparing a programming schedule, an operations team may identify related content and designate a hot key to be sent during the transmission. This determination may be made by a local television operator such as a decision to provide a hot key on a local advertisement that gives the user the opportunity to find out more about a local product. Alternatively, this determination may be made by an original national content provider such as a national network to provide a hot key to all users or to users living in a certain state or region.

Next, at processing block 1005, the alternate content is sent to a user's system to be cached locally. That is, the head-end and data center will transmit the alternate content along with an instruction to cache the alternate content to a STB or other terminal device at the user's premises. The terminal equipment at the user's premises will store the alternate content in a hard drive or other large capacity storage device.

At decision block 1010 a determination is made as to whether the transmission and caching of alternate content is finished. If the transmission is not finished, the transmission will continue at processing block 1005. Alternatively, a service provider may wish to cache only a portion of the alternate content before informing the user of the availability of this content. In this case the determination made in decision block 1010 may be based on a certain portion of the alternate content being transmitted and cached. For example, this determination may be based on 15 minutes or some other arbitrary or non-arbitrary amount of time worth of content being cached on the user's system.

Once the alternate content has been transmitted and cached, a hot key signal may be generated at processing block 1015. According to one embodiment of the present invention, the hot key signal may comprise a special purpose Internet Protocol (IP) packet as described below with reference to FIG. 11. Alternatively, the hot key signal may be any other type of digital signal or packet suitable for transmission over the type of network being used and capable of carrying information similar to that shown in FIG. 11.

Finally, the hot key signal is inserted into the content signal at processing block 1020. That is, the hot key IP packet or other signal is multiplexed with the content data stream as described above with reference to FIG. 8.

Figure 11:
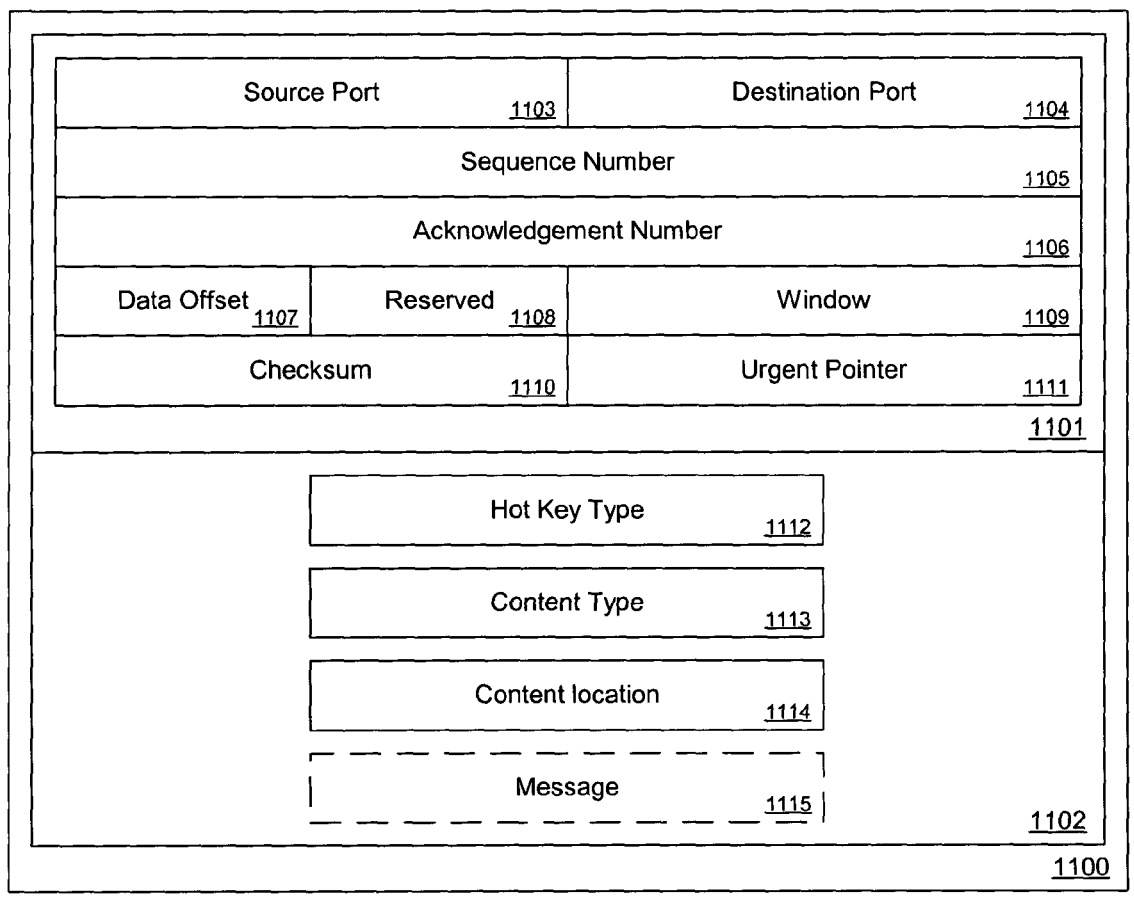
FIG. 11 is a diagram illustrating one possible format for a hot key data packet according to one embodiment of the present invention.

FIG. 11 is a diagram illustrating one possible format for a hot key data packet according to one embodiment of the present invention. This example illustrates an IP data packet 1100. The IP data packet includes a header 1101 and a body 1102.

Header 1101 includes a number of fields 1103-1111 that are typically found in IP data packets. These fields include a source port 1103, a destination port 1104, a sequence number 1105, an acknowledgement number 1106, a data offset 1107, a reserved field 1108, a window field 1109, checksum data 1110, and an urgent pointer 1111. It should be noted that such an IP data packet may be sent to multiple address using IP multicasting. Multicasting therefore allows efficient transmission of the hot key signals from the head-end and data center to users.

Body 1102 may also include a number of fields 1112-1115. These fields may include a hot key type 1112, a content type 1113, a content location 1114, and optionally a message field 1115. In various applications, the number of fields used, size of the fields, type of data presented, format of the data, content of the fields, etc. may vary. For example, in some cases not all of the fields presented here may be used. In other cases, additional data may be presented such as additional graphical or textual information. Additionally, the data may be presented in a wide variety of formats such as plain American Standard Code for Information Interchange (ASCII) text, other binary representations or even encrypted.

Regardless of format, hot key type field 1112 may represent the type of hot key signal being used. For example, the hot key signal represented by IP data packet 1100 may indicate that alternate content is available on another channel or on a web site. Alternatively, the hot key signal may indicate that alternate content is available to be cached on the user's terminal device.

Content type field 1113 may represent the type, genre, or other details about the alternate content. For example, this field 1113 may be used to indicate that the alternate content is a sporting event or movie. Of course, additional details may also be included. For example, the field 1113 may indicate that the alternate content is an action movie and name the actors and director. This information may be used by the user's terminal device to judge the relevance of the hot key signal to the user as will be discussed below.

Content location field 1114 may indicate where the alternate content is located. For example, this field 1114 may indicate another channel, a web site URL or indicate that the content has been cached on the user's terminal device.

Optional message field 1115 may include additional textual or graphical information regarding the hot key or the alternate content. For example, the message field 1115 may contain a text message to be displayed to the user providing details of the alternate content. This message may be presented to the user automatically or at his option to help the user decide whether to accept or decline the hot key.

Figure 12:
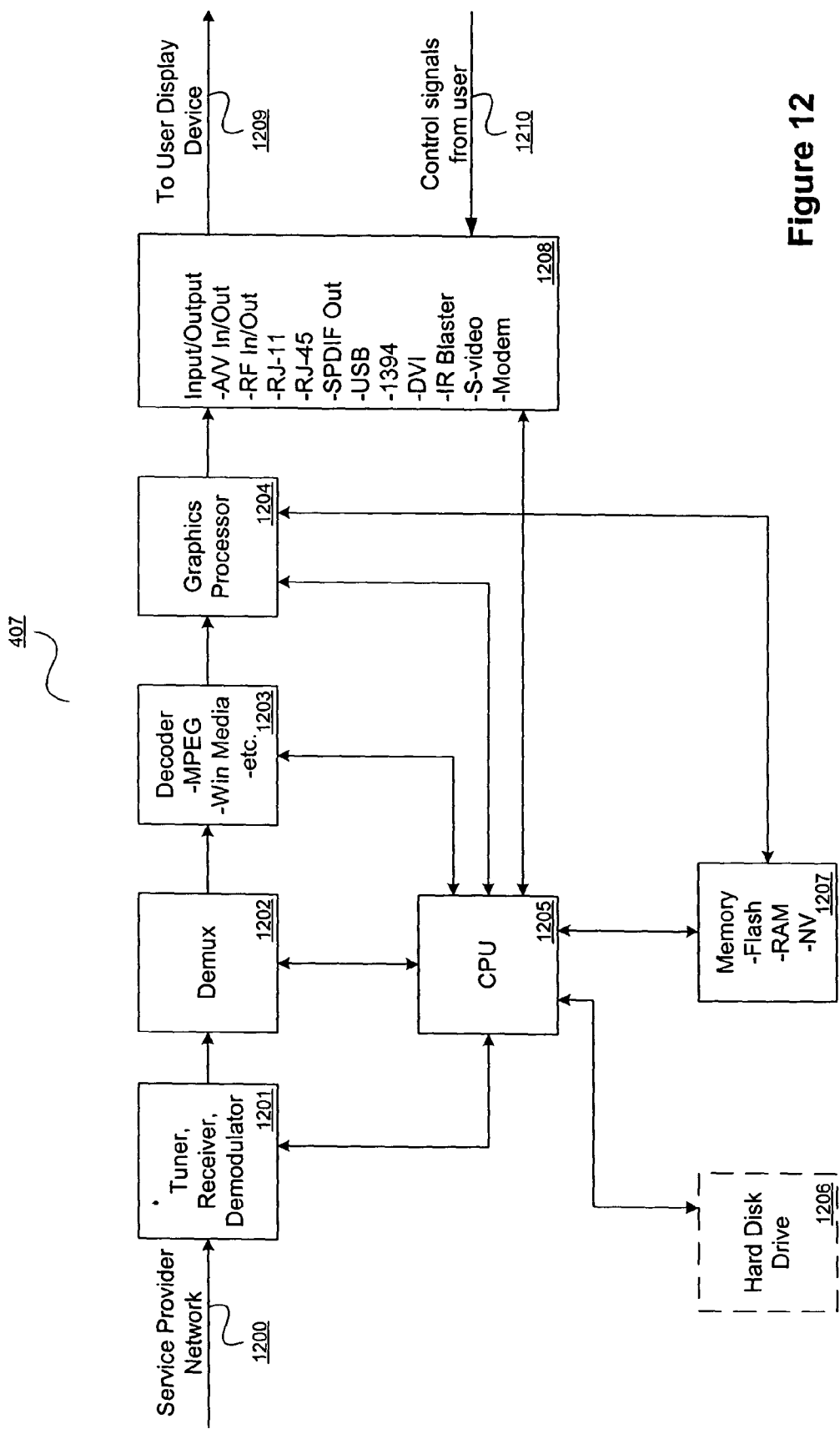
FIG. 12 is a block diagram of a user side system to redirect a user to alternate content responsive to selection of an embedded hot key according to one embodiment of the present invention.

FIG. 12 is a block diagram illustrating a user side system to redirect a user to alternate content responsive to selection of an embedded hot key according to one embodiment of the present invention. As discussed above, the user side system may vary significantly. The user side system comprising a terminal device, STB, Gateway or similar device, performs functions such as exchanging messages (including video-related data) over a network with head-end and data center, receiving messages from a user input device, such as a hand-held remote control unit, translating video signals from a network-native format into a format that can be used by televisions or other display devices, providing a video signal to televisions or other display devices, and other functions.

The functionality of the user side system may reside in a stand-alone device, literally a box that can be placed on, or at least near, the television, that is similar in outward form to conventional devices for receiving cable programs. The user side system functionality could alternatively be performed by hardware resident elsewhere, such as within the television or display console, or by any suitably equipped terminal device. Since the hardware may be proprietary to the service provider and may generally be a physically independent device, the term set top box is used here, but any type of terminal device with similar functionality may be used.

In the example illustrated in FIG. 12, the user side system comprises an STB 407. STB 407 comprises tuner, receiver, demodulator 1201, demultiplexor 1202, decoder 1203, graphics processor 1204, central processing unit (CPU) 1205, optional hard disk drive 1206 or other mass storage device, memory 1207, and various possible inputs and outputs 1208.

Tuner, receiver, demodulator 1201 receives signals from the service provider network 1200 over any of a variety of media as discussed above. Specifically, tuner, receiver, demodulator 1201 receives signals of a frequency band to which it is tuned and demodulates the signals to remove content signals from a carrier signal if any. Demodulated content signals are then supplied by tuner, receiver, and demodulator 1201 to demultiplexor 1202.

Demultiplexor 1202 receives the demodulated content signals from tuner, receiver, and demodulator 1201 and separates the content into multiple data streams representing various channels. The multiple data streams are then supplied as an input to decoder 1203.

Decoder 1203 receives the multiple data streams from demultiplexor 1202 and decodes or decompresses the data streams using an appropriate algorithm. For example, if the head-end and data center compressed the video signals into an MPEG-2 data stream, decoder 1203 will decode the MPEG-2 data stream from demultiplexor 1202 to form a standard video signal. The video signal from decoder 1203 is then supplied to graphics processor 1204.

Graphics processor 1204 receives the decoded video signals from decoder 1203 and processes the video signals to reduce noise, provide amplifications, etc. Processed video signals from graphics processor 1204 are supplied to input/output module 1208. Input/output module 1208 may provide a variety of possible output types. For example, outputs may include but are not limited to Audio/Video (A/V), Radio Frequency (RF), Sony/Phillips Digital Interface (SPDIF), Universal Serial Bus (USB), and others.

Input/output module 1208 also receives control signals from the user. These control signals are typically InfraRed (IR) or Radio Frequency (RF) signals from a remote control unit. Control signals from the user are then fed back from input/output module 1208 to Central Processing Unit (CPU) 1205.

CPU 1205 executes instructions stored in memory 1207. Memory 1207 may comprise A Random Access Memory (RAM) such as flash memory, or other non-volatile memory. The instructions stored in memory 1207, when executed by CPU 1205 cause CPU 1205 to perform various functions such as controlling the various elements of STB 407, receiving hot key signals, and switching to alternate content as will be described below with reference to FIGS. 13 and 14.

Generally, a hot key signal will be received at tuner, receiver, and demodulator 1201 along with and embedded in content signals from the head-end and data center and transmitted over service provider network 1200. CPU 1205 monitors the demultiplexed data streams from demultiplexor 1202 for the presence of relevant hot key signals.

STB 407 may also contain an optional hard disk drive 1206 or other mass storage device. Hard disk drive 1206 allows STB 407 to cache alternate content for later viewing by the user. If CPU 1205 detects a hot key signal instructing content to be cached, the demultiplexed data stream from demultiplexor 1202 may be saved on hard disk drive 1206. The still compressed content is stored on hard disk drive 1206 until the user chooses to view it. Once the user chooses to view the cached content, CPU 1205 may retrieve the content from hard disk drive 1206 and provide the compressed data stream to be decoded by decoder 1203, processed by graphics processor 1204, and output through input/output module 1208.

Figure 13:
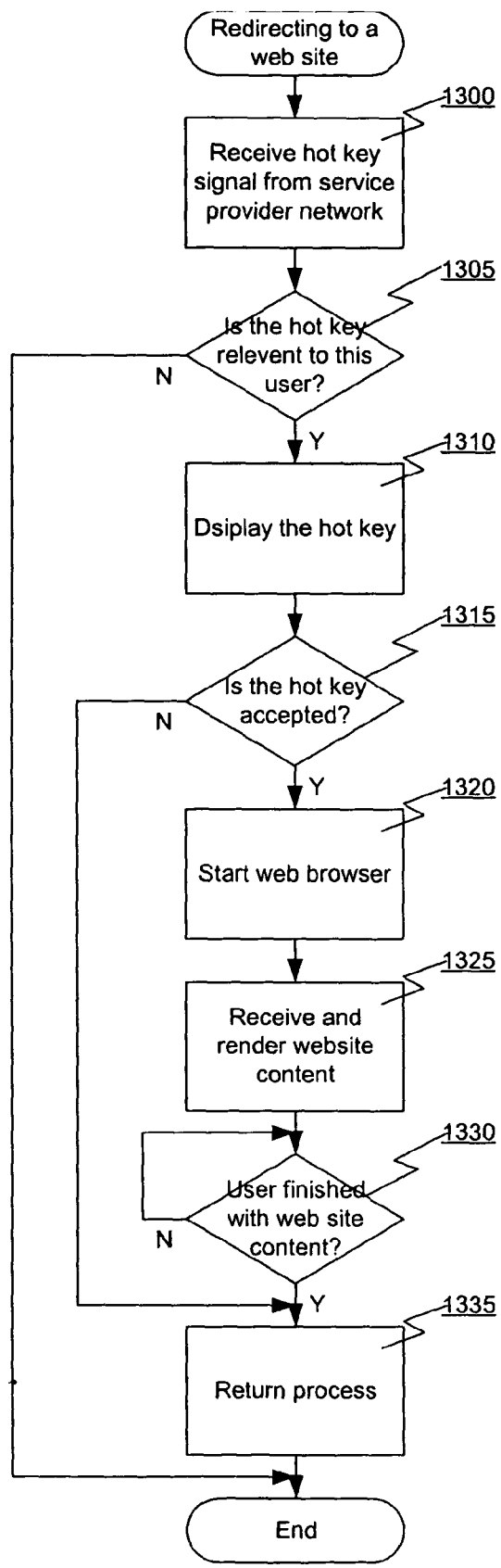
FIG. 13 is a flowchart illustrating processing on a user side system for redirecting a user to alternate content on a web site responsive to selection of an embedded hot key according to one embodiment of the present invention.

FIG. 13 is a flowchart illustrating processing on a user side system for redirecting a user to alternate content on a web site responsive to selection of an embedded hot key according to one embodiment of the present invention. This process may be performed by a system such as described above with reference to FIG. 12 or any other system with similar capabilities.

First, at processing block 1300, the system receives a hot key signal from the service provider's network. As discussed above, the hot key signal may be in the form of a specialized IP packet or another type of signal embedded in the content signal from the service provider.

At decision block 1305 a determination is made as to whether the hot key signal is relevant to the particular user. Since numerous hot key signals may be transmitted at any particular time, the signals may be filtered before being presented to the user. Such filtering may be based on any number of possible algorithms and criteria. For example, only hot key signals related to a channel that is presently being viewed may be considered relevant. Another criteria for determining relevance of a hot key signal may be choices of content type or genres which have been selected by the user. Regardless of the algorithm or criteria used to judge relevance, if the hot key signal is determined at decision block 1305 to not be relevant, no further processing is performed.

If the hot key signal is determined at decision block 1305 to be relevant to the user, a hot key icon or other indication is displayed to the user at processing block 1310. As mentioned above, this indication may be in the form of an icon placed on the screen, a text message, a tone or even a verbal alert. Regardless of the exact form, some indication is given to the user that a hot key has been received.

At decision block 1315 a determination is made as to whether the user has accepted the hot key. As discussed above, the user may use any of a variety of means to indicate acceptance of the hot key. For example, different single or even multiple buttons on a remote control may be pressed by the user to accept or decline the alternate content. According to one embodiment, a single "hot key button" may be present on the user's remote control that may be pressed by the user whenever a hot key icon is present on the television display. Regardless of the exact means of accepting or declining the hot key, if it is determined at decision block 1315 that the user did not accept the hot key, no further processing is performed.

If, at decision block 1315, the user accepts the hot key, a web browser process within the STB is started at processing block 1320. The web browser process is given a URL that may be contained in the hot key signal and indicates the location of the alternate content.

At processing block 1325, the system receives and renders the web site content. That is, the web site content may be in HyperText Mark-up Language (HTML) or another form. The web browser process receives this data and renders it in a form that may be displayed on the user's monitor or television.

At decision block 1330 a determination is made as to whether the user has finished consuming the web site content. This determination may be based on any of a variety of possible criteria. For example, the user may press a button or series of buttons on a remote control to indicate that he has finished viewing the presented material. Alternatively, the user may use a mouse or other pointing device of a remote control to select a graphic on the display to indicate that he has finished viewing the presented material.

Once a determination is made at decision block 1330 that the user is finished with the web site content, a return process is entered at processing block 1335. This return process may include simply returning the user to the previous content. Alternatively, the return process may comprise presenting to the user other available content based on other hot key signals. Another alternative may include presenting a user with a number of choices of how to proceed.

Figure 14:
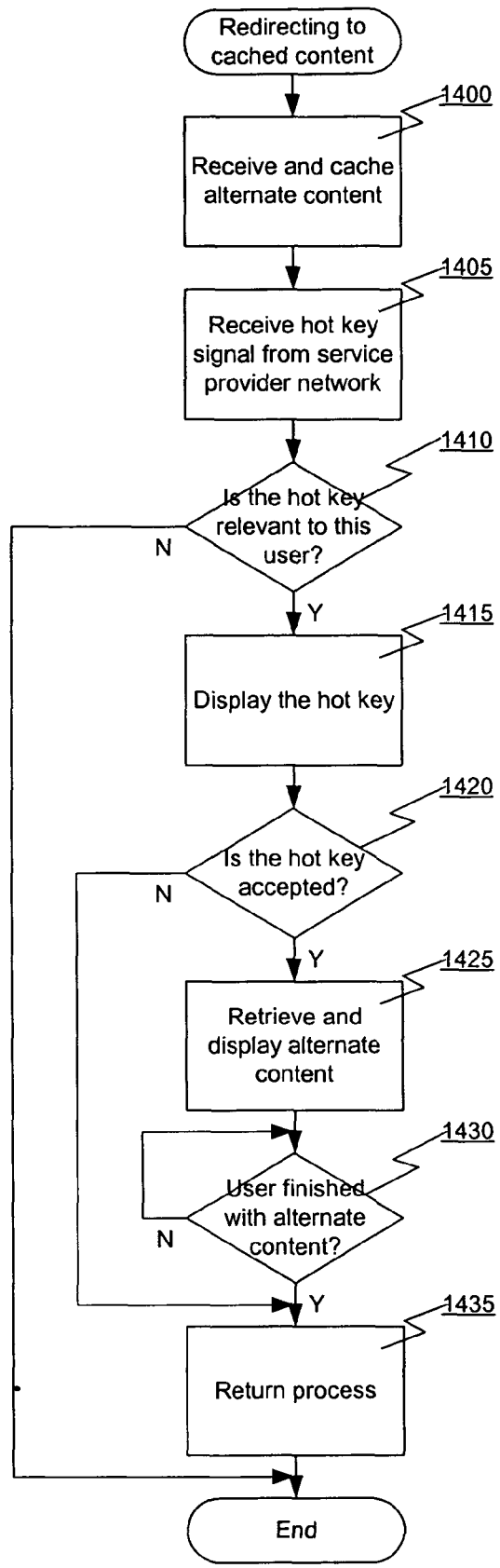
FIG. 14 is a flowchart illustrating processing on a user side system for redirecting a user to locally cached content responsive to selection of an embedded hot key according to one embodiment of the present invention.

FIG. 14 is a flowchart illustrating processing on a user side system for redirecting a user to locally cached content responsive to selection of an embedded hot key according to one embodiment of the present invention. This process may be performed by a system such as described above with reference to FIG. 12 or any other system with similar capabilities.

First, at processing block 1400, the system receives a hot key signal from the service provider's network indicating that content to be cached is being sent. As discussed above, the hot key signal may be in the form of a specialized IP packet or another type of signal embedded in the content signal from the service provider. After the hot key signal is received, the alternate content is received and cached.

At processing block 1405, the system receives a hot key signal from the service provider's network indicating that the content to be cached is now available for viewing. As discussed above, the hot key signal may be in the form of a specialized IP packet or another type of signal embedded in the content signal from the service provider.

At decision block 1410 a determination is made as to whether the hot key signal is relevant to the particular user. Since numerous hot key signals may be transmitted at any particular time, the signals may be filtered before being presented to the user. Such filtering may be based on any number of possible algorithms and criteria. For example, only hot key signals related to a channel that is presently being viewed may be considered relevant. Another criteria for determining relevance of a hot key signal may be choices of content types or genres which have been selected by the viewer. Such choices of content types or genres may also have been selected by the local operator or original provider of the content. Regardless of the algorithm or criteria used to judge relevance, if the hot key signal is determined at decision block 1410 to not be relevant, no further processing is performed.

If the hot key signal is determined at decision block 1410 to be relevant to the user, a hot key icon or other indication is displayed to the user at processing block 1415. As mentioned above, this indication may be in the form of an icon placed on the screen, a text message, a tone or even a verbal alert. Regardless of the exact form, some indication is given to the user that a hot key has been received.

At decision block 1420 a determination is made as to whether the user has accepted the hot key. As discussed above, the user may use any of a variety of means to indicate acceptance of the hot key. For example, different single or even multiple buttons on a remote control may be pressed by the user to accept or decline the alternate content. According to one embodiment, a single "hot key button" may be present on the user's remote control that may be pressed by the user whenever a hot key icon is present on the television display. Regardless of the exact means of accepting or declining the hot key, if it is determined at decision block 1420 the user did not accept the hot key, no further processing is performed.

If, at decision block 1420, the user accepts the hot key, the alternate content is retrieved and displayed at processing block 1425.

At decision block 1430 a determination is made as to whether the user has finished consuming the cached content. This determination may be based on any of a variety of possible criteria. For example, the user may press a button or series of buttons on a remote control to indicate that he has finished viewing the presented material. Alternatively, the end of the file can be marked with queue tones, digital tags, queues within the content itself, or time measured techniques to note the end of the session.

Once a determination is made at decision block 1430 that the user is finished with the web site content, a return process is entered at processing block 1435. This return process may include simply returning the user to the previous content. Alternatively, the return process may comprise presenting to the user other available content based on other hot key signals. Another alternative may include presenting a user with a number of choices of how to proceed.

What is claimed is:

1. A method comprising:
    determining whether to supply alternate content to a terminal device associated with an interactive television service;
    responsive to determining to supply the alternate content to the terminal device, sending the alternate content to the terminal device;
    determining when a specified portion of the alternate content corresponding to a particular play time of the alternate content has been sent to the terminal device, wherein the specified portion is less than all of the alternate content; and
    inserting a hot key signal into content signals transmitted to the terminal device from a head-end transport component via a network after the specified portion of the alternate content has been sent to the terminal device;
    wherein the hot key signal causes the terminal device to present for display an on-screen image overlaid on a television program that is displayed responsive to the hot key signal being determined to be related to the television program, wherein the on-screen image indicates availability of the alternate content prior to displaying the alternate content, and wherein selection of the on-screen image results in the terminal device displaying the alternate content.

2. The method of claim 1, wherein determining whether to supply alternate content to the terminal device is based on information supplied by a provider of the television program.

3. The method of claim 1, wherein determining whether to supply alternate content to the terminal device is based on information generated by an interactive television service provider.

4. The method of claim 1, wherein the hot key signal comprises an internet protocol data packet, the internet protocol data packet having a header portion and a body portion, the body portion having a data field indicating a uniform resource locator that identifies where the alternate content is located.

5. The method of claim 1, wherein the alternate content is related in subject matter to the television program being displayed by the terminal device to a display device.

6. The method of claim 1, wherein the network comprises a cable network.

7. The method of claim 1, wherein the network comprises a satellite network.

8. The method of claim 1, wherein the network comprises a fiber-to-the-curb network.

9. The method of claim 1, wherein the network comprises a fiber-to-the-home network.

10. The method of claim 1, wherein the network comprises a very high speed digital subscriber line network.

11. The method of claim 1, wherein the terminal device comprises a set-top box device.

12. The method of claim 1, wherein the alternate content comprises an advertisement.

13. A system comprising:
    a head-end transport component to transmit content signals over a network; and
    a hot key generation component:
        to determine whether to supply alternate content to a terminal device associated with an interactive television service;
        to respond to a determination to supply the alternate content to the terminal device;
        to send the alternate content to the terminal device; and
        to insert a hot key signal in the content signals in response to a determination that a specified portion of the alternate content has been sent to the terminal device;
    wherein the hot key signal indicates availability of the alternate content, wherein the hot key signal causes the terminal device to display an on-screen image overlaid on a television program that is displayed based on the content signals when the hot key signal is determined to be related to the television program, wherein the on-screen image indicates availability of the alternate content, and wherein selection of the on-screen image causes the terminal device to display the alternate content.

14. The system of claim 13, wherein the head-end transport component receives the hot key signal from the hot key generation component and multiplexes the hot key signal with the content signals.

15. The system of claim 13, wherein the hot key generation component determines whether to supply the alternate content to the terminal device based on information supplied by a content provider.

16. The system of claim 13, wherein the hot key generation component determines whether to supply the alternate content to the terminal device based on information generated by an interactive television service provider.

17. The system of claim 13, wherein the hot key signal comprises an internet protocol data packet, the internet protocol data packet having a header portion and a body portion, the body portion having a data field indicating a uniform resource locator that identifies where the alternate content is located.

18. The system of claim 13, wherein the alternate content is related to content being displayed by the terminal device to a display device.

19. The system of claim 13, wherein the network comprises a cable network.

20. The system of claim 13, wherein the network comprises a satellite network.

21. The system of claim 13, wherein the network comprises a fiber-to-the-curb network.

22. The system of claim 13, wherein the network comprises a fiber-to-the-home network.

23. The system of claim 13, wherein the network comprises a very high speed digital subscriber line network.

24. The system of claim 13, wherein the specified portion is all of the alternate content.

25. The system of claim 13, wherein the specified portion is less than all of the alternate content.

26. The system of claim 25, wherein the specified portion corresponds to a particular play time of the alternate content.

27. A machine readable storage device comprising instructions that, when executed by a processor, cause the processor to perform a method comprising:
sending media content to a terminal device via a network, wherein, in response to receiving the media content, the terminal device processes the media content and sends a television program included in the media content to a display device coupled to the terminal device, and wherein the terminal device is associated with an interactive television service;
determining whether to supply alternate content to the terminal device;
sending the alternate content to the terminal device in response to a determination to supply the alternate content to the terminal device;
generating a hot key signal indicating availability of the alternate content; and
inserting the hot key signal into a content signal transmitted to the terminal device from a head-end transport component via the network in response to a determination that a specified portion of the alternate content has been sent to the terminal device;
wherein the hot key signal causes the terminal device to display an on-screen image overlaid on the television program when the hot key signal is determined to be related to the television program, wherein the on-screen-image indicates availability of the alternate content, and wherein selection of the on-screen image causes the terminal device to display the alternate content.

28. The machine readable storage device of claim 27, wherein the method further comprises determining whether to supply the alternate content to the terminal device based on information supplied by a content provider.

29. The machine readable storage device of claim 27, wherein the method further comprises determining whether to supply the alternate content to the terminal device based on information generated by an interactive television service provider.

30. The machine readable storage device of claim 27, wherein the hot key signal comprises an internet protocol data packet, the internet protocol data packet having a header portion and a body portion, the body portion having a data field indicating a uniform resource locator that identifies where the alternate content is located.

31. The machine readable storage device of claim 27, wherein the alternate content is related to content being displayed to the terminal device.

32. The machine readable storage device of claim 27, wherein the network comprises a cable network.

33. The machine readable storage device of claim 27, wherein the network comprises a satellite network.

34. The machine readable storage device of claim 27, wherein the network comprises a fiber-to-the-curb network.

35. The machine readable storage device of claim 27, wherein the network comprises a fiber-to-the-home network.

36. The machine readable storage device of claim 27, wherein the network comprises a very high speed digital subscriber line network.

37. The machine readable storage device of claim 27, wherein the alternate content is related in subject matter to the television program.

38. The machine readable storage device of claim 27, wherein the alternate content comprises an advertisement.

* * * * *